(12) United States Patent
Liao et al.

(10) Patent No.: US 11,815,660 B2
(45) Date of Patent: Nov. 14, 2023

(54) OPTICAL IMAGING LENS

(71) Applicant: Genius Electronic Optical (Xiamen) Co., Ltd., Fujian (CN)

(72) Inventors: Huabin Liao, Fujian (CN); Hai Lin, Fujian (CN); Ou Zhou, Fujian (CN); Lanlan Zhang, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 252 days.

(21) Appl. No.: 17/211,834

(22) Filed: Mar. 25, 2021

(65) Prior Publication Data
US 2022/0252834 A1 Aug. 11, 2022

(30) Foreign Application Priority Data

Feb. 5, 2021 (CN) .......................... 202110167267.X

(51) Int. Cl.
*G02B 13/04* (2006.01)
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ................................ G02B 13/004; G02B 9/34
See application file for complete search history.

(56) References Cited

U.S. PATENT DOCUMENTS

2014/0078601 A1\* 3/2014 Hsu ...................... G02B 13/004
359/715

\* cited by examiner

*Primary Examiner* — Joseph P Martinez
(74) *Attorney, Agent, or Firm* — Winston Hsu

(57) ABSTRACT

An optical imaging lens includes a first lens element to a fourth lens element, and each lens element has an object-side surface and an image-side surface. The first lens element has negative refracting power, an optical axis region of the object-side surface of the first lens element is convex, the third lens element has negative refracting power, and an optical axis region of the image-side surface of the fourth lens element is convex. Lens elements included by the optical imaging lens are only the four lens elements described above, and the optical imaging lens satisfies the relationship of Tmax+Tmin≤700.000 μm, Tmax is a maximum thickness of the four lens elements from the first lens element to the fourth lens element along the optical axis, Tmin is a minimum thickness of the four lens elements from the first lens element to the fourth lens element along the optical axis.

20 Claims, 40 Drawing Sheets

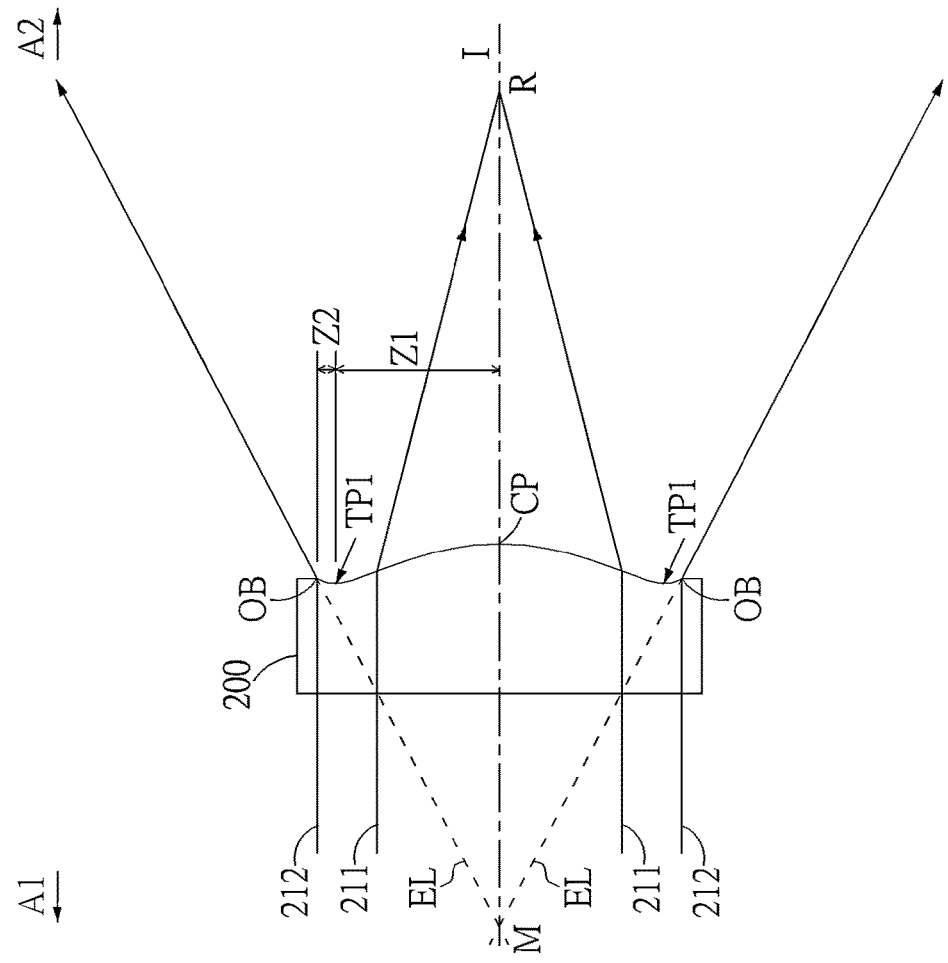
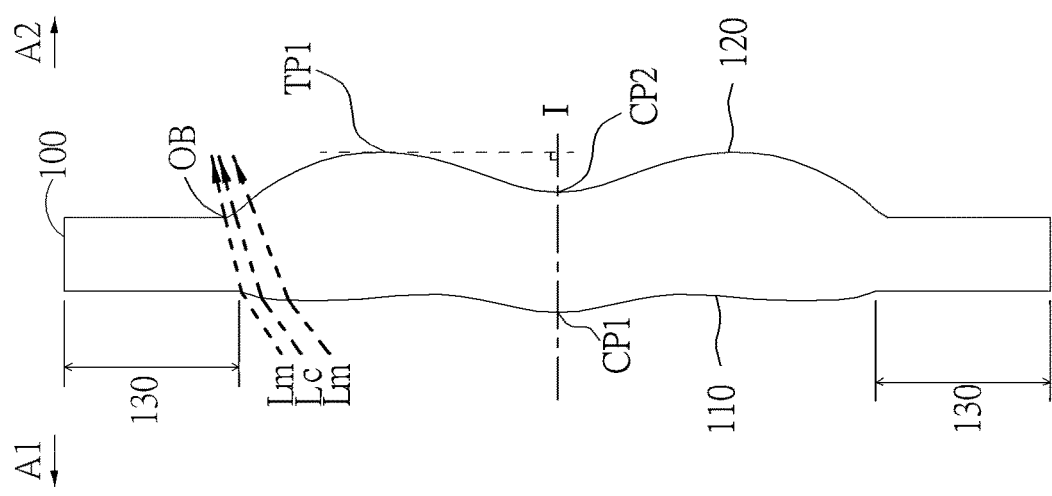

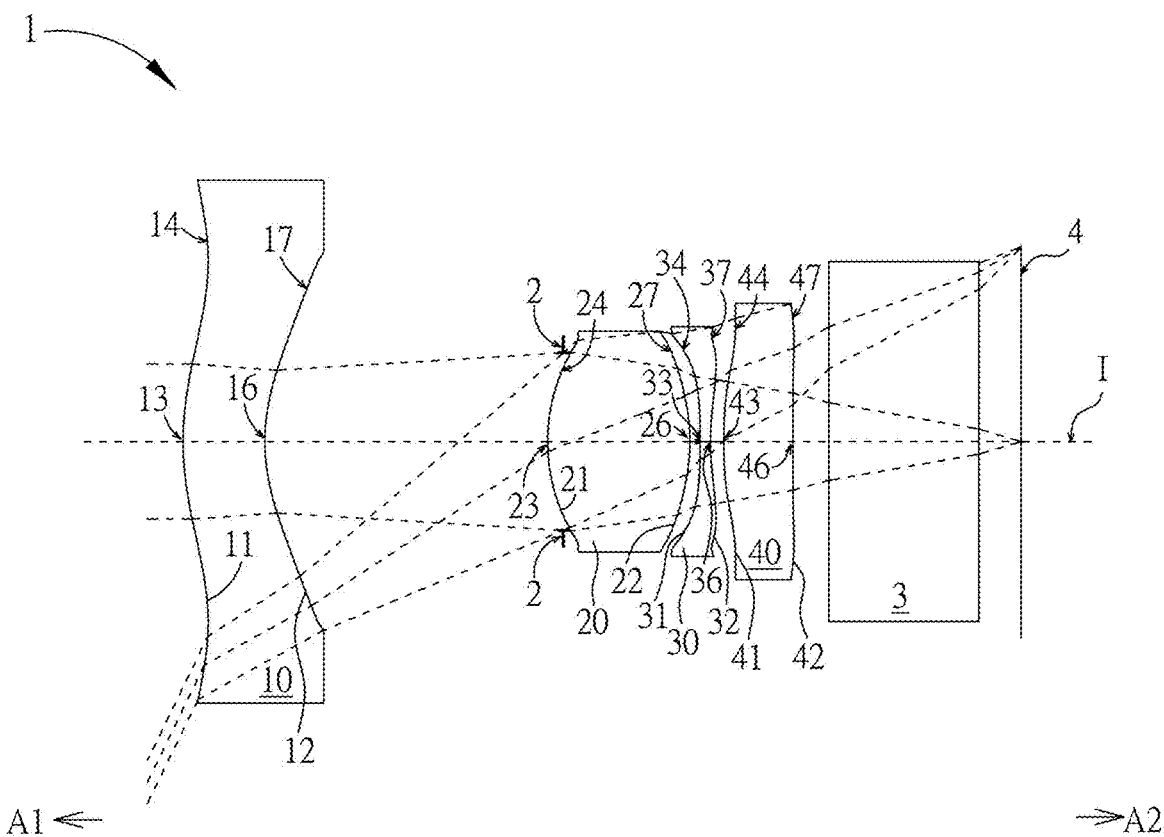
FIG. 6
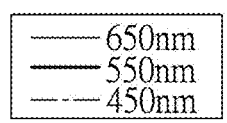
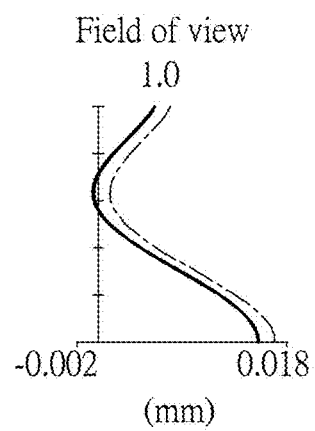
FIG. 7A
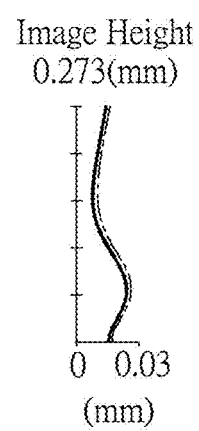
FIG. 7B
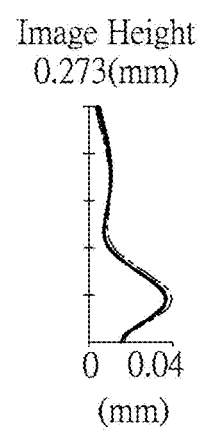
FIG. 7C
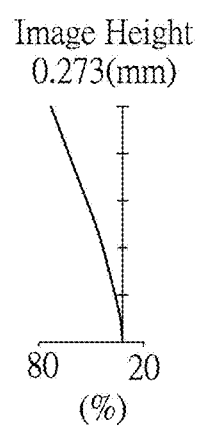
FIG. 7D

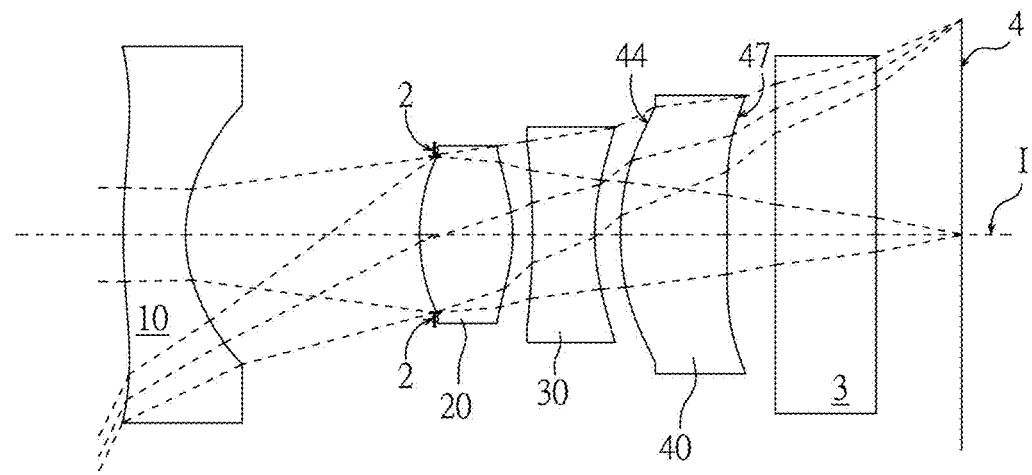
FIG. 8
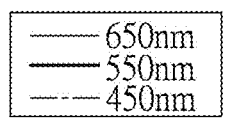
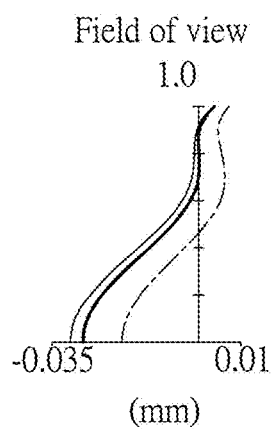
Field of view
1.0
-0.035　0.01
(mm)
Longitudinal
spherical aberration
FIG. 9A
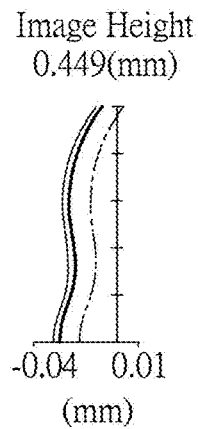
Image Height
0.449(mm)
-0.04　0.01
(mm)
Sagittal field
curvature
FIG. 9B
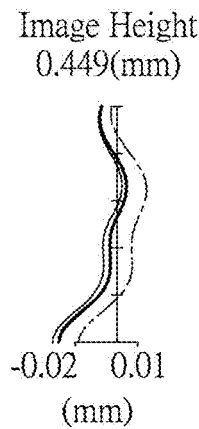
Image Height
0.449(mm)
-0.02　0.01
(mm)
Tangential
field curvature
FIG. 9C
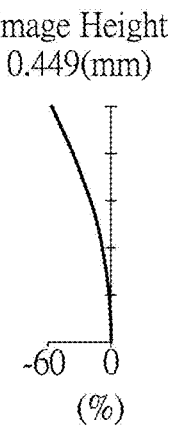
Image Height
0.449(mm)
-60　0
(%)
Distortion
FIG. 9D

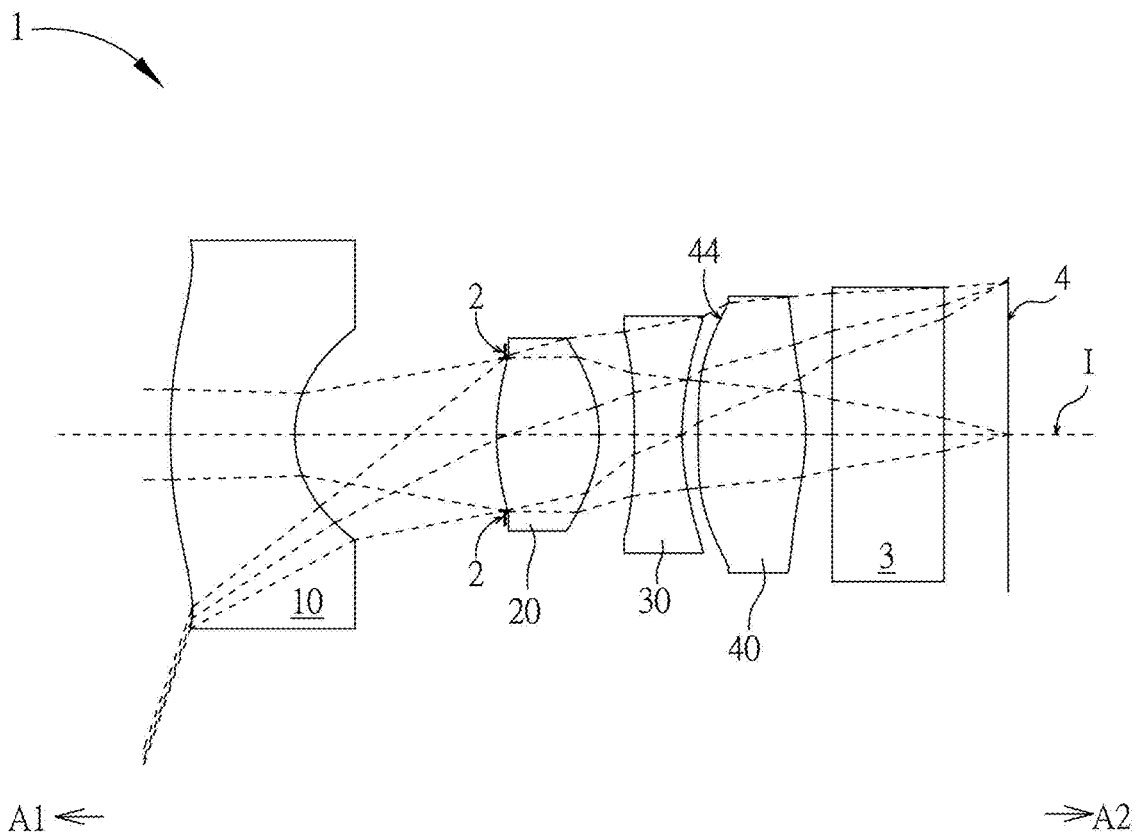
FIG. 10
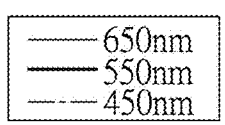
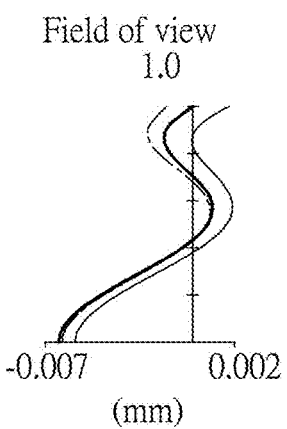
FIG. 11A
Field of view 1.0
-0.007    0.002
(mm)
Longitudinal spherical aberration
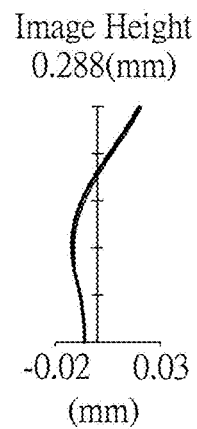
FIG. 11B
Image Height 0.288(mm)
-0.02    0.03
(mm)
Sagittal field curvature
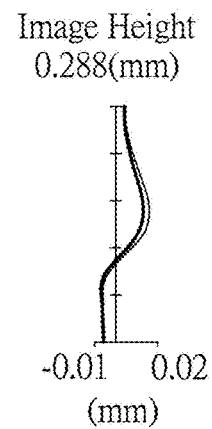
FIG. 11C
Image Height 0.288(mm)
-0.01    0.02
(mm)
Tangential field curvature
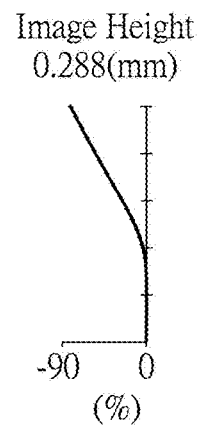
FIG. 11D
Image Height 0.288(mm)
-90    0
(%)
Distortion Longitudinal spherical aberration Sagittal field curvature Tangential field curvature Distortion

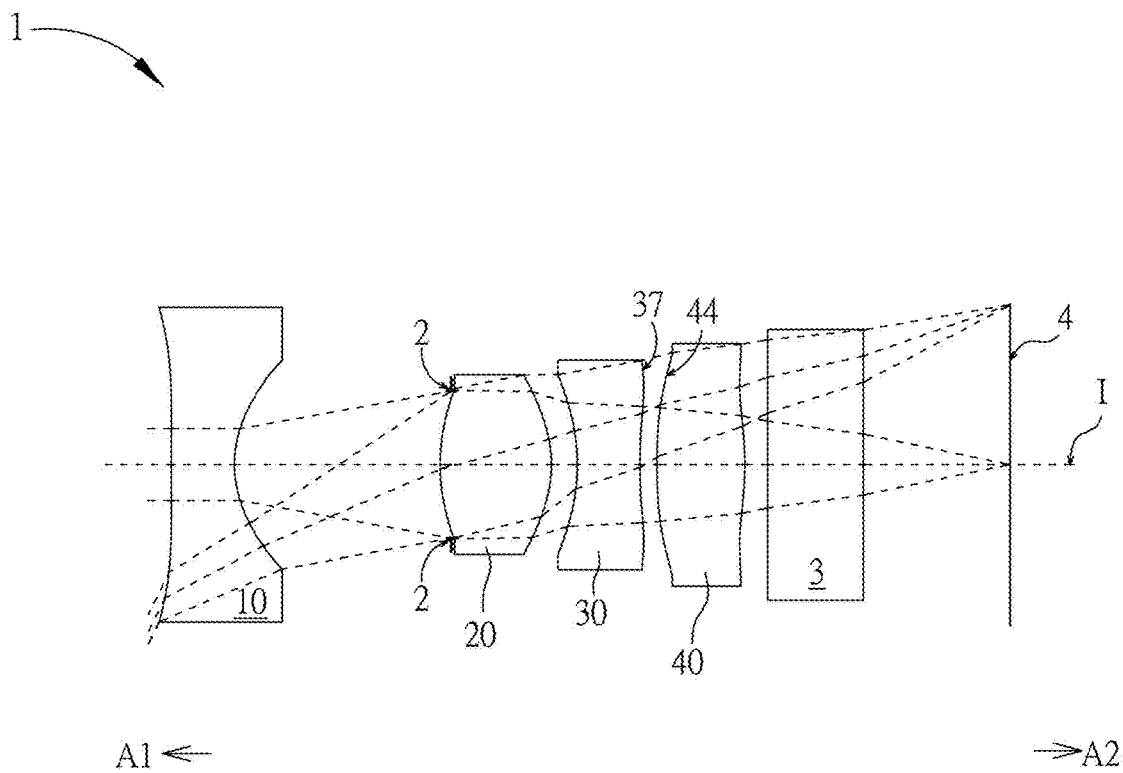
FIG. 14
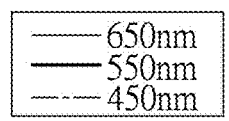
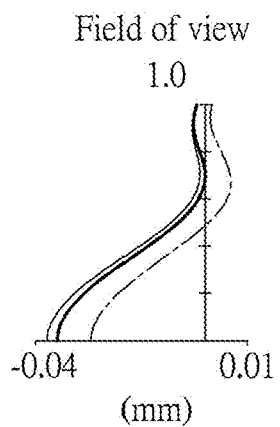
Field of view
1.0
-0.04   0.01
(mm)
Longitudinal
spherical aberration
FIG. 15A
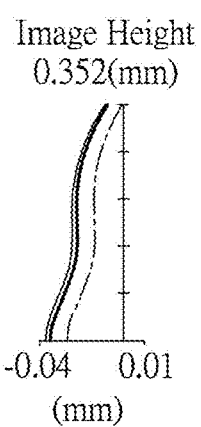
Image Height
0.352(mm)
-0.04   0.01
(mm)
Sagittal field
curvature
FIG. 15B
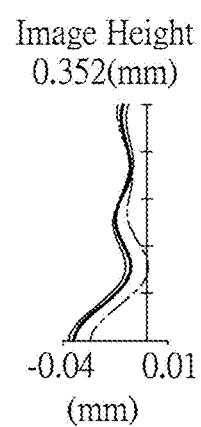
Image Height
0.352(mm)
-0.04   0.01
(mm)
Tangential
field curvature
FIG. 15C
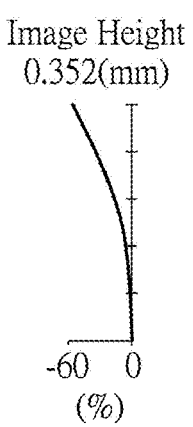
Image Height
0.352(mm)
-60    0
(%)
Distortion
FIG. 15D

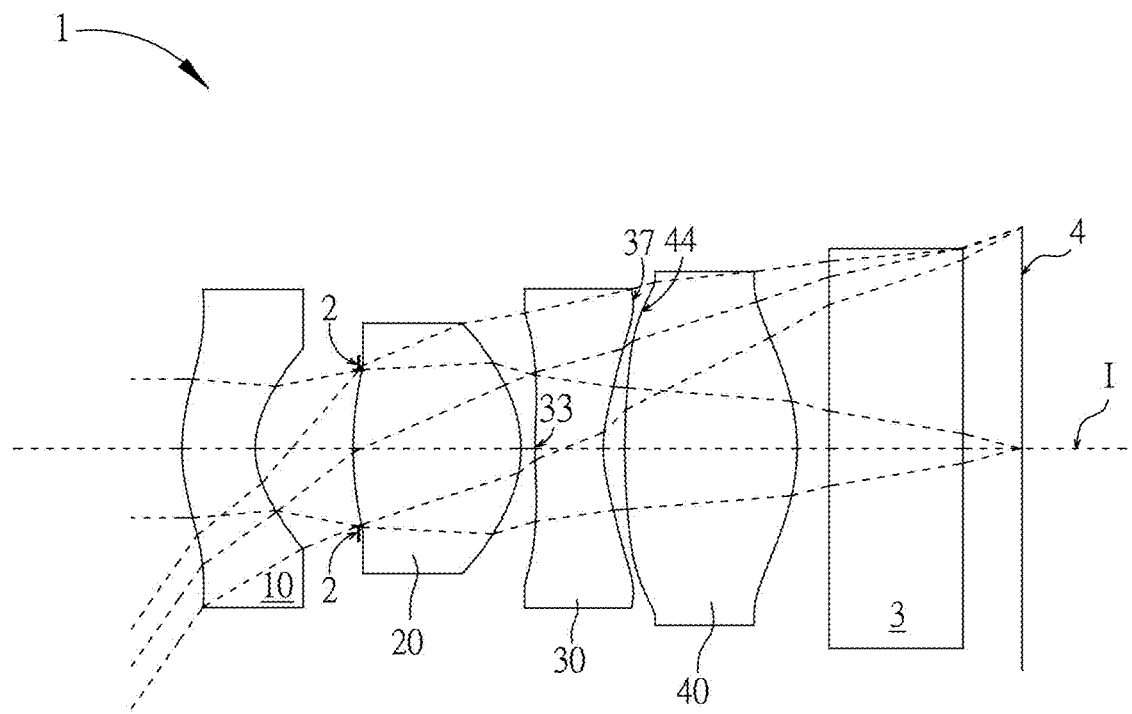
FIG. 16
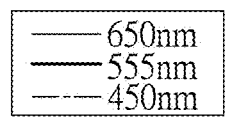
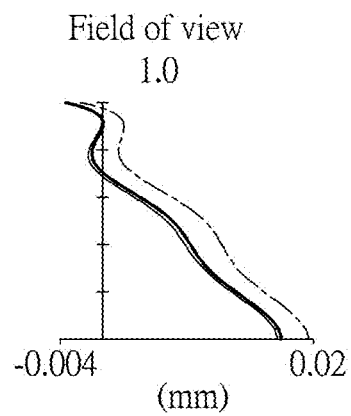
Longitudinal
spherical aberration
FIG. 17A
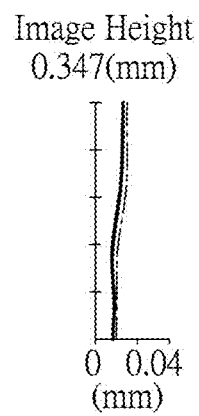
Sagittal field
curvature
FIG. 17B
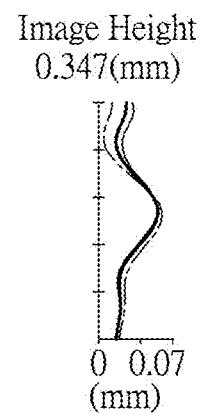
Tangential
field curvature
FIG. 17C
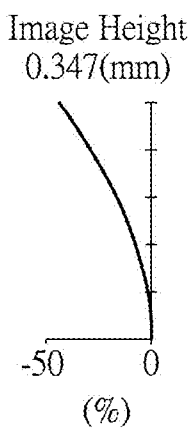
Distortion
FIG. 17D

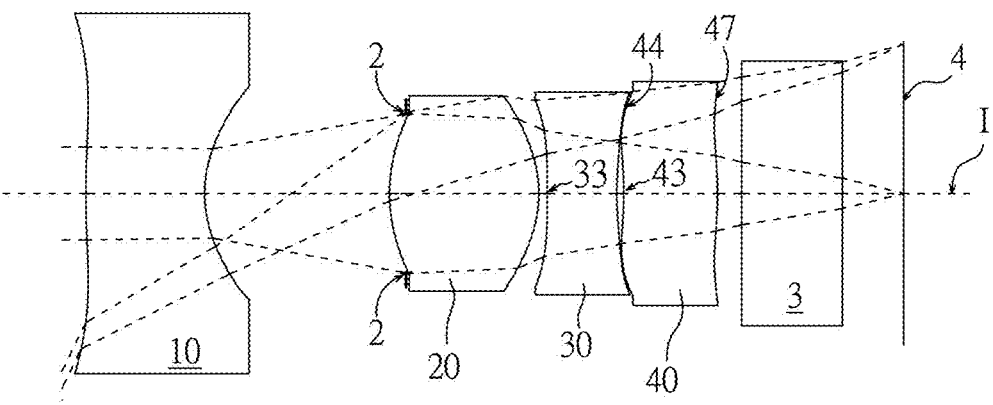
FIG. 18
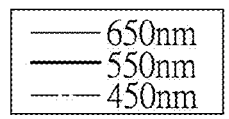
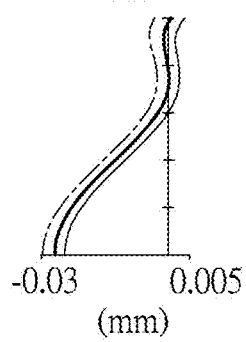
Longitudinal
spherical aberration
FIG. 19A
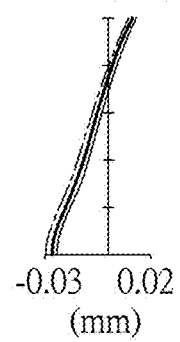
Sagittal field
curvature
FIG. 19B
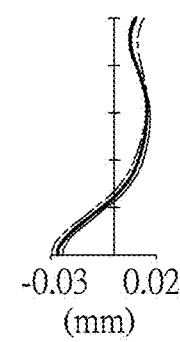
Tangential
field curvature
FIG. 19C
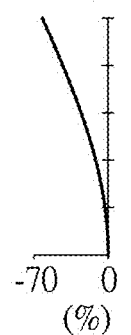
Distortion
FIG. 19D

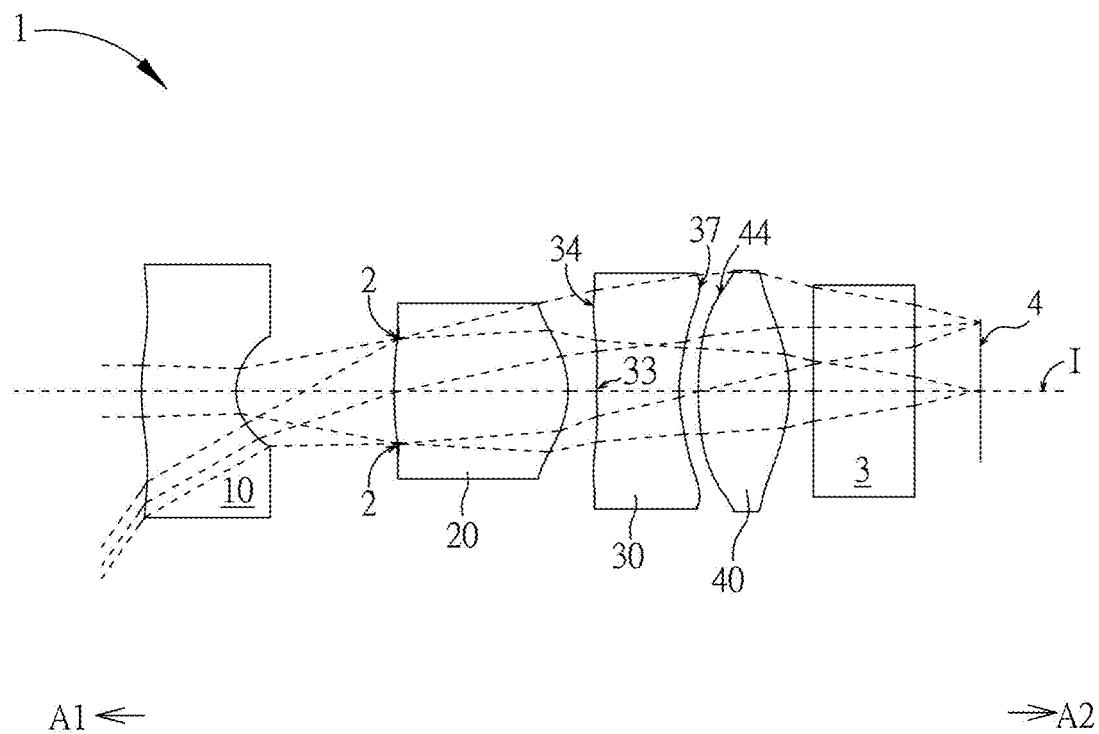
FIG. 20
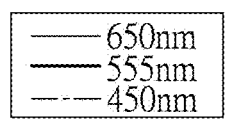
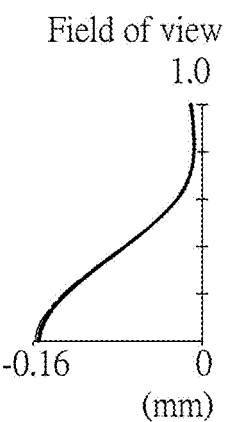
Field of view
1.0
-0.16      0
   (mm)
Longitudinal
spherical aberration
FIG. 21A
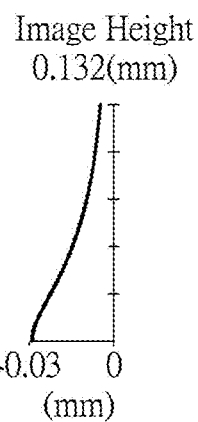
Image Height
0.132(mm)
-0.03     0
  (mm)
Sagittal field
curvature
FIG. 21B
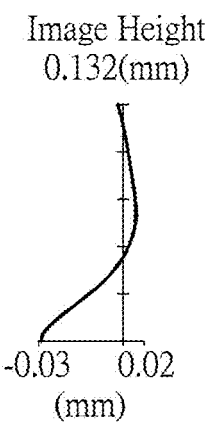
Image Height
0.132(mm)
-0.03   0.02
   (mm)
Tangential
field curvature
FIG. 21C
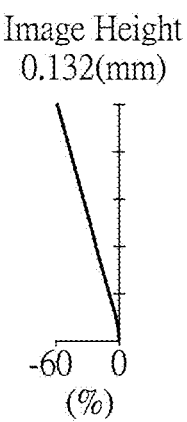
Image Height
0.132(mm)
-60       0
   (%)
Distortion
FIG. 21D Longitudinal spherical aberration Sagittal field curvature Tangential field curvature Distortion

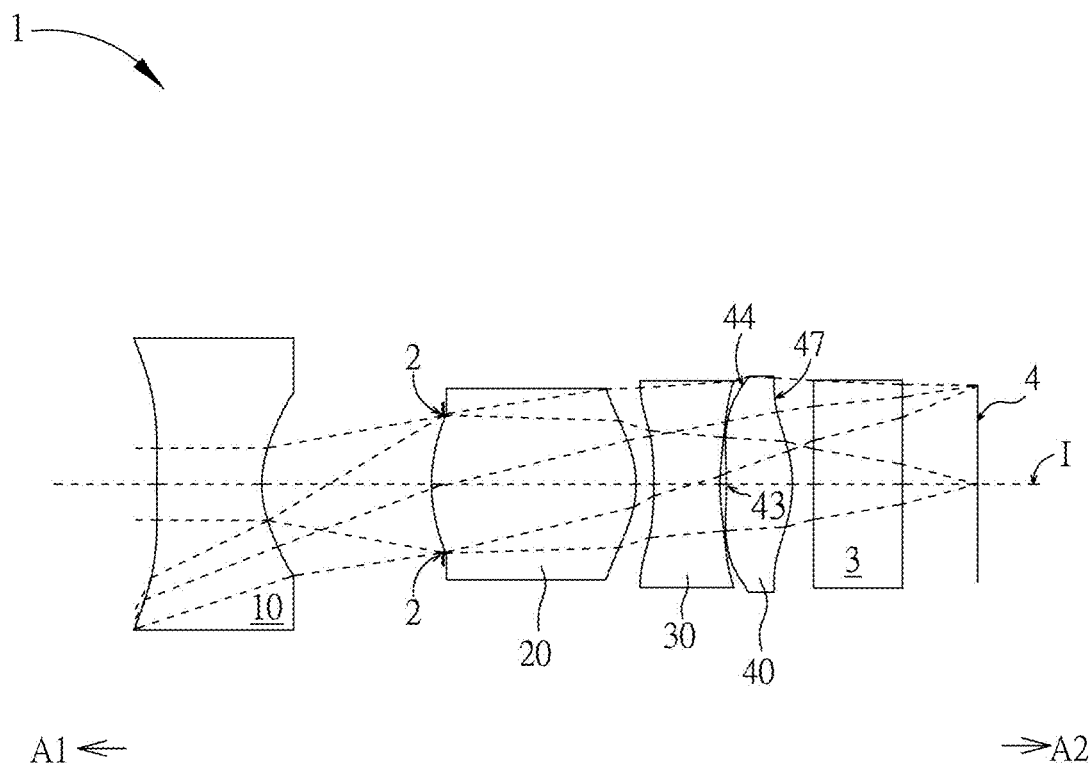
FIG. 24
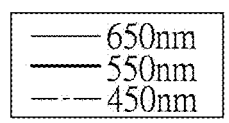
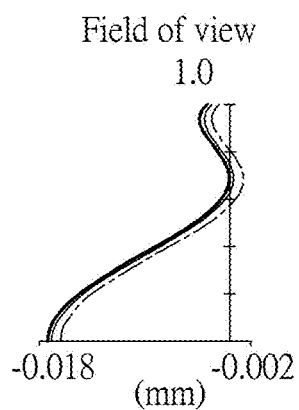
Field of view
1.0
-0.018  -0.002
(mm)
Longitudinal
spherical aberration
FIG. 25A
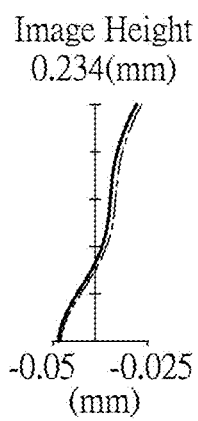
Image Height
0.234(mm)
-0.05  -0.025
(mm)
Sagittal field
curvature
FIG. 25B
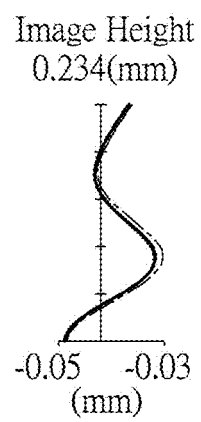
Image Height
0.234(mm)
-0.05  -0.03
(mm)
Tangential
field curvature
FIG. 25C
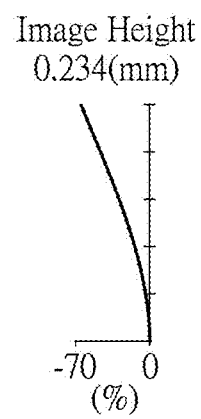
Image Height
0.234(mm)
-70   0
(%)
Distortion
FIG. 25D

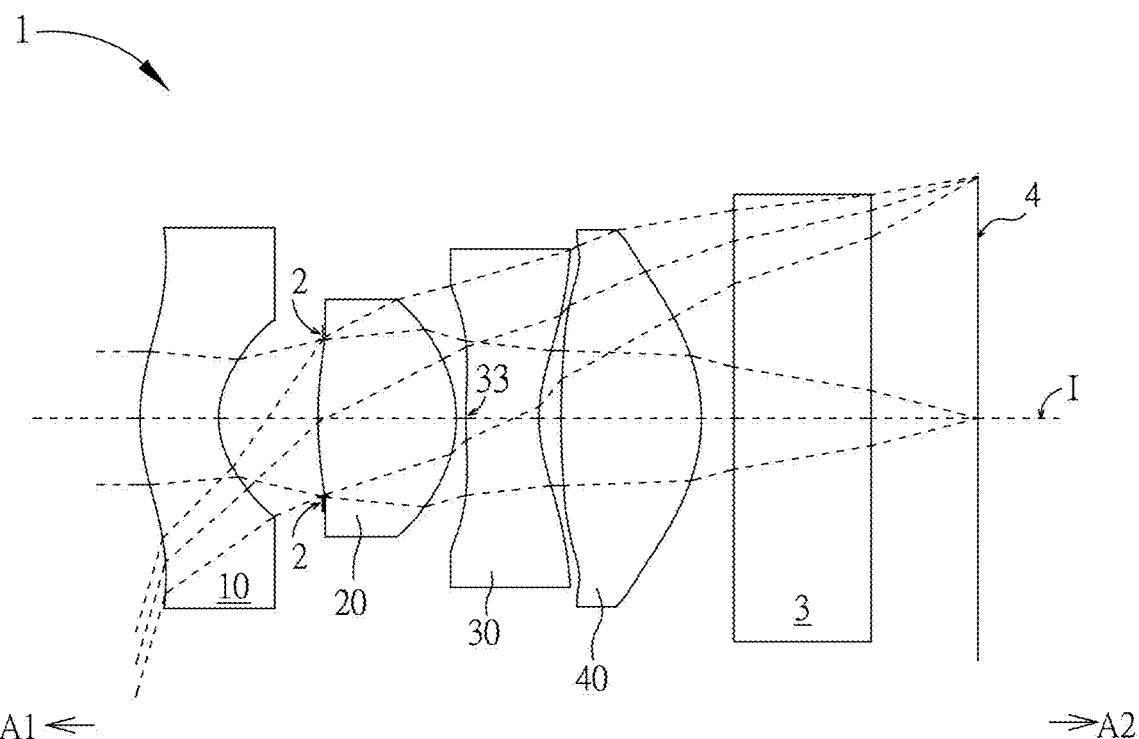
FIG. 28
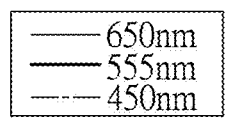
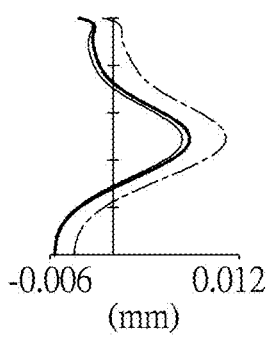
Longitudinal spherical aberration
FIG. 29A
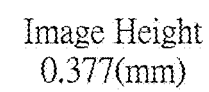
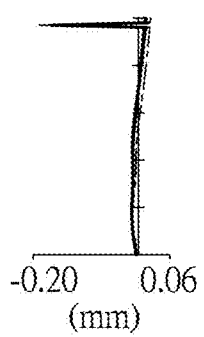
Sagittal field curvature
FIG. 29B
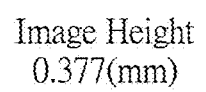
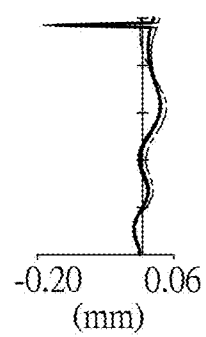
Tangential field curvature
FIG. 29C
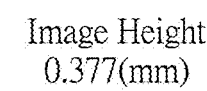
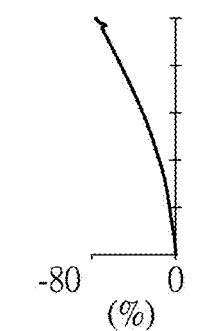
Distortion
FIG. 29D

| First Embodiment |||||||
|---|---|---|---|---|---|---|
| TTL=1.172 mm; EFL=0.435 mm; HFOV=64.000degrees; ImgH=0.273mm; Fno=2.000 |||||||
| No. | | Radius of Curvature (mm) | Ape. Stop Distance Thickness Air Gap (mm) | Material | Refractive Index | Abbe No. | Focal Length (mm) |
| | Object | Infinity | Infinity | | | | |
| 11 | First Lens Element | 0.419 | 0.114 | T1 Plastic | 1.545 | 55.987 | -2.139 |
| 12 | | 0.278 | 0.417 | G12 | | | |
| 2 | Ape. Stop | Infinity | -0.022 | | | | |
| 21 | Second Lens Element | 0.262 | 0.199 | T2 Plastic | 1.535 | 55.690 | 0.279 |
| 22 | | -0.257 | 0.014 | G23 | | | |
| 31 | Third Lens Element | -1.308 | 0.015 | T3 Plastic | 1.661 | 20.373 | -0.468 |
| 32 | | 0.413 | 0.019 | G34 | | | |
| 41 | Fourth Lens Element | 0.985 | 0.097 | T4 Plastic | 1.535 | 55.690 | 1.765 |
| 42 | | -23.834 | 0.050 | G4F | | | |
| 3 | Filter | Infinity | 0.210 | TF | 1.517 | 64.167 | |
| | | Infinity | 0.059 | GFP | | | |
| 4 | Image Plane | Infinity | | | | | |

FIG. 30

| No. | K | $a_2$ | $a_4$ | $a_6$ | $a_8$ | $a_{10}$ |
|---|---|---|---|---|---|---|
| 11 | 0.000000E+00 | 0.000000E+00 | -1.210609E+01 | -2.567033E+01 | 4.878665E+02 | -1.694492E+03 |
| 12 | 0.000000E+00 | 0.000000E+00 | -1.284822E+01 | -4.173513E+02 | 9.023766E+03 | -7.159493E+04 |
| 21 | 0.000000E+00 | 0.000000E+00 | 1.271490E+01 | -1.223299E+03 | 5.844858E+04 | -1.192585E+06 |
| 22 | 0.000000E+00 | 0.000000E+00 | 4.637442E+01 | -7.042296E+02 | -5.691325E+04 | 1.484567E+06 |
| 31 | 0.000000E+00 | 0.000000E+00 | -5.796013E+01 | 5.911016E+02 | -1.280326E+05 | 4.374873E+06 |
| 32 | 0.000000E+00 | 0.000000E+00 | -2.680548E+01 | -2.921072E+03 | 7.539536E+04 | 5.588424E+05 |
| 41 | 0.000000E+00 | 0.000000E+00 | 8.616747E+01 | -5.906952E+03 | 1.324816E+05 | -1.008120E+06 |
| 42 | 0.000000E+00 | 0.000000E+00 | 9.952314E+00 | -1.215743E+02 | -1.213169E+04 | 1.883221E+05 |

FIG. 31

| Second Embodiment ||||||||
|---|---|---|---|---|---|---|---|
| TTL=1.744 mm; EFL=0.494 mm; HFOV=64.000degrees; ImgH=0.449 mm; Fno=2.433 ||||||||
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 1.304 | 0.130 | T1 | Plastic | 1.545 | 55.987 | -0.820 |
| 12 | | 0.322 | 0.518 | G12 | | | | |
| 2 | Ape. Stop | Infinity | -0.031 | | | | | |
| 21 | Second Lens Element | 0.400 | 0.194 | T2 | Plastic | 1.535 | 55.690 | 0.363 |
| 22 | | -0.315 | 0.042 | G23 | | | | |
| 31 | Third Lens Element | -1.050 | 0.129 | T3 | Plastic | 1.661 | 20.373 | -0.485 |
| 32 | | 0.492 | 0.054 | G34 | | | | |
| 41 | Fourth Lens Element | 0.608 | 0.222 | T4 | Plastic | 1.535 | 55.690 | 1.013 |
| 42 | | -4.459 | 0.100 | G4F | | | | |
| 3 | Filter | Infinity | 0.210 | TF | | 1.517 | 64.167 | |
| | | Infinity | 0.177 | GFP | | | | |
| 4 | Image Plane | Infinity | | | | | | |

FIG. 32

| No. | K | $a_2$ | $a_4$ | $a_6$ | $a_8$ | $a_{10}$ |
|---|---|---|---|---|---|---|
| 11 | 0.000000E+00 | 0.000000E+00 | -2.649279E+00 | -1.048644E+01 | 1.129646E+02 | -2.815184E+02 |
| 12 | 0.000000E+00 | 0.000000E+00 | 5.499925E-01 | -1.805443E+02 | 2.136733E+03 | -1.100057E+04 |
| 21 | 0.000000E+00 | 0.000000E+00 | -1.292320E+00 | 1.369932E+02 | -1.541403E+03 | 2.731567E+04 |
| 22 | 0.000000E+00 | 0.000000E+00 | 3.019541E+01 | -5.686557E+02 | 1.340220E+04 | -7.578596E+04 |
| 31 | 0.000000E+00 | 0.000000E+00 | 1.415926E+01 | -5.039667E+02 | 1.020886E+04 | -9.747522E+04 |
| 32 | 0.000000E+00 | 0.000000E+00 | -2.075663E+00 | -8.793358E+01 | 8.758664E+02 | -3.551865E+03 |
| 41 | 0.000000E+00 | 0.000000E+00 | 8.550543E+00 | -1.300632E+02 | 8.318483E+02 | -4.077522E+03 |
| 42 | 0.000000E+00 | 0.000000E+00 | 8.639980E+00 | 2.879150E+01 | -7.873131E+02 | 2.124954E+03 |

FIG. 33

| Third Embodiment | | | | | | | |
|---|---|---|---|---|---|---|---|
| TTL=1.576 mm; EFL=0.341 mm; HFOV=72.000degrees; ImgH=0.288 mm; Fno=2.000 | | | | | | | |
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 1.061 | 0.234 | T1 | Plastic | 1.545 | 55.987 | -0.563 |
| 12 | | 0.220 | 0.396 | G12 | | | | |
| 2 | Ape. Stop | Infinity | -0.016 | | | | | |
| 21 | Second Lens Element | 0.472 | 0.193 | T2 | Plastic | 1.535 | 55.690 | 0.322 |
| 22 | | -0.234 | 0.066 | G23 | | | | |
| 31 | Third Lens Element | -2.564 | 0.090 | T3 | Plastic | 1.661 | 20.373 | -0.582 |
| 32 | | 0.465 | 0.030 | G34 | | | | |
| 41 | Fourth Lens Element | 7.026 | 0.202 | T4 | Plastic | 1.535 | 55.690 | 0.715 |
| 42 | | -0.402 | 0.050 | G4F | | | | |
| 3 | Filter | Infinity | 0.210 | TF | | 1.517 | 64.167 | |
| | | Infinity | 0.121 | GFP | | | | |
| 4 | Image Plane | Infinity | | | | | | |

FIG. 34

| No. | K | $a_2$ | $a_4$ | $a_6$ | $a_8$ | $a_{10}$ |
|---|---|---|---|---|---|---|
| 11 | 0.000000E+00 | 0.000000E+00 | 2.779100E+00 | -4.535958E+01 | 1.154201E+02 | -1.223512E+02 |
| 12 | 0.000000E+00 | 0.000000E+00 | 8.293409E+00 | -3.213271E+02 | 1.726449E+03 | -9.929106E+04 |
| 21 | 0.000000E+00 | 0.000000E+00 | -2.920233E+00 | 1.176853E+02 | -8.726377E+03 | 1.236166E+05 |
| 22 | 0.000000E+00 | 0.000000E+00 | 2.576228E+01 | -3.059957E+02 | 7.400308E+03 | -3.591384E+04 |
| 31 | 0.000000E+00 | 0.000000E+00 | -1.729090E+01 | 3.933941E+02 | -2.028441E+03 | -5.468456E+04 |
| 32 | 0.000000E+00 | 0.000000E+00 | -1.592834E+01 | 3.946147E+02 | -4.416763E+03 | 2.476971E+03 |
| 41 | 0.000000E+00 | 0.000000E+00 | 3.805742E+01 | -6.940757E+02 | 6.724838E+03 | -3.010462E+04 |
| 42 | 0.000000E+00 | 0.000000E+00 | 2.297682E+01 | -8.519101E+01 | -1.840057E+03 | 1.592786E+04 |

FIG. 35

| Fourth Embodiment | | | | | | | |
|---|---|---|---|---|---|---|---|
| TTL=1.460 mm; EFL=0.240 mm; HFOV=55.000degrees; ImgH=0.280 mm; Fno=2.000 | | | | | | | |
| No. | | Radius of Curvature (mm) | Ape. Stop Distance Thickness Air Gap (mm) | Material | Refractive Index | Abbe No. | Focal Length (mm) |
| | Object | Infinity | Infinity | | | | |
| 11 | First Lens Element | 0.648 | 0.197 | T1 | Plastic | 1.535 | 55.690 | -0.306 |
| 12 | | 0.117 | 0.199 | G12 | | | | |
| 2 | Ape. Stop | Infinity | -3.110E-05 | | | | |
| 21 | Second Lens Element | 0.555 | 0.348 | T2 | Plastic | 1.535 | 55.690 | 0.327 |
| 22 | | -0.201 | 0.126 | G23 | | | | |
| 31 | Third Lens Element | -2.196 | 0.117 | T3 | Plastic | 1.661 | 20.373 | -0.589 |
| 32 | | 0.488 | 0.020 | G34 | | | | |
| 41 | Fourth Lens Element | 1.327 | 0.126 | T4 | Plastic | 1.535 | 55.690 | 0.402 |
| 42 | | -0.249 | 0.070 | G4F | | | | |
| 3 | Filter | Infinity | 0.210 | TF | | 1.517 | 64.167 | |
| | | Infinity | 0.048 | GFP | | | | |
| 4 | Image Plane | Infinity | | | | | | |

FIG. 36

| No. | K | $a_2$ | $a_4$ | $a_6$ | $a_8$ | $a_{10}$ |
|---|---|---|---|---|---|---|
| 11 | 0.000000E+00 | 0.000000E+00 | 1.331157E+01 | -1.248546E+03 | 3.981997E+04 | -6.706055E+05 |
| 12 | -4.691224E-01 | 0.000000E+00 | -1.492328E+01 | -1.740022E+04 | 2.720213E+06 | -2.384845E+08 |
| 21 | 1.555414E+00 | 0.000000E+00 | 5.766120E+00 | -8.482841E+03 | 1.521234E+06 | -1.535655E+08 |
| 22 | -2.266706E-02 | 0.000000E+00 | 8.701484E-01 | 1.284088E+03 | 2.144946E+03 | -5.364269E+06 |
| 31 | 0.000000E+00 | 0.000000E+00 | -4.916967E+01 | 7.454724E+02 | 1.679313E+05 | -1.484579E+07 |
| 32 | -7.715165E-01 | 0.000000E+00 | -8.074762E+01 | 2.971881E+03 | -1.109013E+05 | 3.956008E+06 |
| 41 | 2.396140E+01 | 0.000000E+00 | 4.141978E+01 | -1.115406E+03 | -4.761525E+02 | 2.216008E+06 |
| 42 | -3.377472E-01 | 0.000000E+00 | 1.066495E+02 | -1.611386E+03 | 6.920280E+04 | -3.299493E+06 |
| No. | $a_{12}$ | $a_{14}$ | $a_{16}$ | $a_{18}$ | $a_{20}$ | |
| 11 | 5.768987E+06 | -2.074656E+07 | 8.754904E+06 | 0.000000E+00 | 0.000000E+00 | |
| 12 | 1.146021E+10 | -2.928959E+11 | 3.025901E+12 | 0.000000E+00 | 0.000000E+00 | |
| 21 | 8.203623E+09 | -2.573434E+11 | 7.500760E+12 | 0.000000E+00 | 0.000000E+00 | |
| 22 | 3.345180E+08 | -8.520273E+09 | 8.341949E+10 | 0.000000E+00 | 0.000000E+00 | |
| 31 | 5.879754E+08 | -1.184053E+10 | 8.522324E+10 | 6.899216E+11 | -1.048318E+13 | |
| 32 | -9.802256E+07 | 1.500299E+09 | -1.408018E+10 | 7.654518E+10 | -1.726100E+11 | |
| 41 | -1.045292E+08 | 2.400899E+09 | -3.159445E+10 | 2.330226E+11 | -7.721442E+11 | |
| 42 | 9.593909E+07 | -1.765263E+09 | 2.001432E+10 | -1.263168E+11 | 3.381241E+11 | |

FIG. 37

| Fifth Embodiment |||||||
|---|---|---|---|---|---|---|
| TTL=1.839 mm; EFL=0.378 mm; HFOV=64.000degrees; ImgH=0.352 mm; Fno=2.304 |||||||
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | |
| 11 | First Lens Element | 12.841 | 0.139 | T1 | Plastic | 1.545 | 55.987 | -0.484 |
| 12 | | 0.258 | 0.475 | G12 | | | |
| 2 | Ape. Stop | Infinity | -0.025 | | | | |
| 21 | Second Lens Element | 0.433 | 0.244 | T2 | Plastic | 1.535 | 55.690 | 0.349 |
| 22 | | -0.266 | 0.057 | G23 | | | |
| 31 | Third Lens Element | -0.480 | 0.138 | T3 | Plastic | 1.661 | 20.373 | -0.495 |
| 32 | | 1.187 | 0.037 | G34 | | | |
| 41 | Fourth Lens Element | 1.331 | 0.192 | T4 | Plastic | 1.535 | 55.690 | 0.824 |
| 42 | | -0.630 | 0.050 | G4F | | | |
| 3 | Filter | Infinity | 0.210 | TF | | 1.517 | 64.167 |
| | | Infinity | 0.322 | GFP | | | |
| 4 | Image Plane | Infinity | | | | | |

FIG. 38

| No. | K | $a_2$ | $a_4$ | $a_6$ | $a_8$ | $a_{10}$ |
|---|---|---|---|---|---|---|
| 11 | 0.000000E+00 | 0.000000E+00 | -1.762082E+00 | -2.547943E+01 | 2.947304E+02 | -9.513370E+02 |
| 12 | 0.000000E+00 | 0.000000E+00 | 3.131140E+00 | -6.852537E+02 | 1.395227E+04 | -1.259921E+05 |
| 21 | 0.000000E+00 | 0.000000E+00 | -2.565982E+00 | 5.753884E+01 | -2.016608E+03 | 1.245890E+04 |
| 22 | 0.000000E+00 | 0.000000E+00 | 2.305099E+01 | -4.379702E+02 | 1.165702E+04 | -1.048242E+05 |
| 31 | 0.000000E+00 | 0.000000E+00 | -4.840770E+00 | -5.801171E+01 | 1.120610E+04 | -1.638008E+05 |
| 32 | 0.000000E+00 | 0.000000E+00 | -1.868343E+01 | 2.017496E+02 | 3.354368E+03 | -5.613189E+04 |
| 41 | 0.000000E+00 | 0.000000E+00 | 7.021197E+00 | -1.119687E+02 | 2.549929E+03 | -2.972878E+04 |
| 42 | 0.000000E+00 | 0.000000E+00 | 1.507707E+01 | 2.850057E+01 | -2.043963E+03 | 8.695364E+03 |

FIG. 39

| Sixth Embodiment |||||||
|---|---|---|---|---|---|---|
| TTL=1.316 mm; EFL=0.436 mm; HFOV=55.000degrees; ImgH=0.347 mm; Fno=2.000 |||||||
| No. | Radius of Curvature (mm) | Ape. Stop Distance Thickness Air Gap (mm) | Material | Refractive Index | Abbe No. | Focal Length (mm) |
| Object | Infinity | Infinity | | | | |
| 11 First Lens Element | 0.307 | 0.115 | T1 Plastic | 1.535 | 55.690 | -0.645 |
| 12 | 0.141 | 0.162 | G12 | | | |
| 2 Ape. Stop | Infinity | -0.008 | | | | |
| 21 Second Lens Element | 0.564 | 0.263 | T2 Plastic | 1.535 | 55.690 | 0.314 |
| 22 | -0.201 | 0.022 | G23 | | | |
| 31 Third Lens Element | 0.843 | 0.107 | T3 Plastic | 1.661 | 20.373 | -0.467 |
| 32 | 0.216 | 0.034 | G34 | | | |
| 41 Fourth Lens Element | 1.487 | 0.270 | T4 Plastic | 1.535 | 55.690 | 0.502 |
| 42 | -0.308 | 0.050 | G4F | | | |
| 3 Filter | Infinity | 0.210 | TF | 1.517 | 64.167 | |
| | Infinity | 0.093 | GFP | | | |
| 4 Image Plane | Infinity | | | | | |

FIG. 40

| No. | K | $a_2$ | $a_4$ | $a_6$ | $a_8$ | $a_{10}$ |
|---|---|---|---|---|---|---|
| 11 | 0.000000E+00 | 0.000000E+00 | -1.098144E+01 | -1.204483E+03 | 4.001288E+04 | -6.681500E+05 |
| 12 | -4.987548E-01 | 0.000000E+00 | 2.730735E+01 | -2.055927E+04 | 2.822944E+06 | -2.352895E+08 |
| 21 | 5.301428E+00 | 0.000000E+00 | 2.514588E+01 | -9.101739E+03 | 1.520420E+06 | -1.504730E+08 |
| 22 | -2.386295E-02 | 0.000000E+00 | 3.231428E+00 | 1.586026E+03 | 6.859371E+02 | -5.433336E+06 |
| 31 | 0.000000E+00 | 0.000000E+00 | -5.901980E+01 | 7.375415E+02 | 1.688325E+05 | -1.484469E+07 |
| 32 | -8.273978E-01 | 0.000000E+00 | -8.684963E+01 | 2.935643E+03 | -1.113349E+05 | 3.968253E+06 |
| 41 | 2.864863E+01 | 0.000000E+00 | 1.346167E+01 | -9.597076E+02 | 2.988455E+03 | 2.224305E+06 |
| 42 | -3.708569E-01 | 0.000000E+00 | 1.545785E+01 | -9.262388E+02 | 7.211475E+04 | -3.296510E+06 |

| No. | $a_{12}$ | $a_{14}$ | $a_{16}$ | $a_{18}$ | $a_{20}$ |
|---|---|---|---|---|---|
| 11 | 5.791983E+06 | -2.107443E+07 | 4.257343E+06 | 0.000000E+00 | 0.000000E+00 |
| 12 | 1.143619E+10 | -2.958764E+11 | 3.142252E+12 | 0.000000E+00 | 0.000000E+00 |
| 21 | 8.500387E+09 | -2.559538E+11 | 3.220800E+12 | 0.000000E+00 | 0.000000E+00 |
| 22 | 3.337422E+08 | -8.518861E+09 | 8.357257E+10 | 0.000000E+00 | 0.000000E+00 |
| 31 | 5.880695E+08 | -1.183460E+10 | 8.533139E+10 | 6.892536E+11 | -1.060791E+13 |
| 32 | -9.773270E+07 | 1.503249E+09 | -1.407681E+10 | 7.588688E+10 | -1.916129E+11 |
| 41 | -1.048138E+08 | 2.396112E+09 | -3.162189E+10 | 2.333885E+11 | -7.531354E+11 |
| 42 | 9.584711E+07 | -1.767022E+09 | 2.000348E+10 | -1.263224E+11 | 3.385680E+11 |

FIG. 41

| Seventh Embodiment ||||||||
|---|---|---|---|---|---|---|---|
| TTL=1.701 mm; EFL=0.388 mm; HFOV=64.000degrees; ImgH=0.311 mm; Fno=2.000 ||||||||
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 1.667 | 0.247 | T1 | Plastic | 1.545 | 55.987 | -0.585 |
| 12 | | 0.254 | 0.419 | G12 | | | | |
| 2 | Ape. Stop | Infinity | -0.035 | | | | | |
| 21 | Second Lens Element | 0.348 | 0.311 | T2 | Plastic | 1.535 | 55.690 | 0.330 |
| 22 | | -0.249 | 0.017 | G23 | | | | |
| 31 | Third Lens Element | 86.161 | 0.145 | T3 | Plastic | 1.661 | 20.373 | -0.995 |
| 32 | | 0.659 | 0.015 | G34 | | | | |
| 41 | Fourth Lens Element | -0.668 | 0.195 | T4 | Plastic | 1.535 | 55.690 | -97.398 |
| 42 | | -0.746 | 0.050 | G4F | | | | |
| 3 | Filter | Infinity | 0.210 | TF | | 1.517 | 64.167 | |
| | | Infinity | 0.127 | GFP | | | | |
| 4 | Image Plane | Infinity | | | | | | |

FIG. 42

| No. | K | $a_2$ | $a_4$ | $a_6$ | $a_8$ | $a_{10}$ |
|---|---|---|---|---|---|---|
| 11 | 0.000000E+00 | 0.000000E+00 | -4.441663E+00 | -9.051792E+00 | 2.209975E+02 | -7.050944E+02 |
| 12 | 0.000000E+00 | 0.000000E+00 | -6.334051E+00 | -5.417152E+02 | 1.339155E+04 | -1.240793E+05 |
| 21 | 0.000000E+00 | 0.000000E+00 | -1.422846E+00 | -6.436278E+01 | -2.564492E+02 | -7.578102E+03 |
| 22 | 0.000000E+00 | 0.000000E+00 | 2.224989E+01 | -3.953475E+02 | 1.099382E+04 | -8.564280E+04 |
| 31 | 0.000000E+00 | 0.000000E+00 | -2.235544E+01 | -1.180208E+02 | 1.206008E+04 | -1.421821E+05 |
| 32 | 0.000000E+00 | 0.000000E+00 | -2.481498E+01 | 4.795319E+02 | 4.718973E+03 | -1.106235E+05 |
| 41 | 0.000000E+00 | 0.000000E+00 | 3.003531E+01 | -6.008558E+01 | 2.770942E+03 | -7.515038E+04 |
| 42 | 0.000000E+00 | 0.000000E+00 | 1.881238E+01 | 1.397623E+01 | -3.562451E+03 | 2.408210E+04 |

FIG. 43

| Eighth Embodiment | | | | | | | |
|---|---|---|---|---|---|---|---|
| TTL=1.743 mm; EFL=0.226 mm; HFOV=55.000degrees; ImgH=0.132 mm; Fno=2.104 | | | | | | | |
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 0.501 | 0.196 | T1 | Plastic | 1.535 | 55.690 | -0.394 |
| 12 | | 0.128 | 0.337 | G12 | | | | |
| 2 | Ape. Stop | Infinity | -8.487E-03 | | | | | |
| 21 | Second Lens Element | 0.780 | 0.361 | T2 | Plastic | 1.535 | 55.690 | 0.334 |
| 22 | | -0.195 | 0.059 | G23 | | | | |
| 31 | Third Lens Element | 0.987 | 0.171 | T3 | Plastic | 1.661 | 20.373 | -0.578 |
| 32 | | 0.258 | 0.040 | G34 | | | | |
| 41 | Fourth Lens Element | 0.734 | 0.189 | T4 | Plastic | 1.535 | 55.690 | 0.420 |
| 42 | | -0.296 | 0.050 | G4F | | | | |
| 3 | Filter | Infinity | 0.210 | TF | | 1.517 | 64.167 | |
| | | Infinity | 0.137 | GFP | | | | |
| 4 | Image Plane | Infinity | | | | | | |

FIG. 44

| No. | K | $a_2$ | $a_4$ | $a_6$ | $a_8$ | $a_{10}$ |
|---|---|---|---|---|---|---|
| 11 | 0.000000E+00 | 0.000000E+00 | -1.322796E+01 | -9.340674E+02 | 3.849457E+04 | -6.709170E+05 |
| 12 | 1.012024E-01 | 0.000000E+00 | 2.245240E+02 | -5.404274E+04 | 5.424417E+06 | -3.507809E+08 |
| 21 | -4.691097E+02 | 0.000000E+00 | 3.217866E+01 | -4.061426E+03 | 1.026284E+06 | -1.243121E+08 |
| 22 | -1.623927E-02 | 0.000000E+00 | 1.599064E+01 | 9.293727E+02 | 3.154042E+04 | -5.384541E+06 |
| 31 | 0.000000E+00 | 0.000000E+00 | -9.787216E+01 | 3.203963E+03 | 1.152957E+05 | -1.416433E+07 |
| 32 | -3.120644E+00 | 0.000000E+00 | -8.127253E+01 | 3.773979E+03 | -1.174180E+05 | 3.647743E+06 |
| 41 | 5.620972E+00 | 0.000000E+00 | 6.469246E+00 | 1.207717E+02 | -2.660116E+04 | 2.367022E+06 |
| 42 | -1.916522E-01 | 0.000000E+00 | 3.212691E+01 | -1.511756E+03 | 7.884395E+04 | -3.211995E+06 |

| No. | $a_{12}$ | $a_{14}$ | $a_{16}$ | $a_{18}$ | $a_{20}$ |
|---|---|---|---|---|---|
| 11 | 5.879394E+06 | -2.021445E+07 | -1.020904E+07 | 0.000000E+00 | 0.000000E+00 |
| 12 | 1.387870E+10 | -2.961899E+11 | 3.145796E+12 | 0.000000E+00 | 0.000000E+00 |
| 21 | 7.948191E+09 | -2.554145E+11 | 3.166316E+12 | 0.000000E+00 | 0.000000E+00 |
| 22 | 3.320746E+08 | -8.531172E+09 | 8.315731E+10 | 0.000000E+00 | 0.000000E+00 |
| 31 | 5.849704E+08 | -1.185724E+10 | 8.544546E+10 | 6.888003E+11 | -1.072212E+13 |
| 32 | -9.269531E+07 | 1.483569E+09 | -1.408154E+10 | 7.589101E+10 | -1.897375E+11 |
| 41 | -1.002829E+08 | 2.345714E+09 | -3.161695E+10 | 2.334014E+11 | -7.544661E+11 |
| 42 | 9.421918E+07 | -1.764774E+09 | 2.000406E+10 | -1.263413E+11 | 3.379998E+11 |

FIG. 45

| Ninth Embodiment ||||||||
|---|---|---|---|---|---|---|---|
| TTL=1.318 mm; EFL=0.553 mm; HFOV=55.000degrees; ImgH=0.280 mm; Fno=2.000 ||||||||
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 0.303 | 0.208 | T1 | Plastic | 1.535 | 55.690 | -0.882 |
| 12 | | 0.140 | 0.155 | G12 | | | | |
| 2 | Ape. Stop | Infinity | -0.008 | | | | | |
| 21 | Second Lens Element | 0.604 | 0.251 | T2 | Plastic | 1.535 | 55.690 | 0.315 |
| 22 | | -0.201 | 0.045 | G23 | | | | |
| 31 | Third Lens Element | 0.939 | 0.100 | T3 | Plastic | 1.661 | 20.373 | -0.436 |
| 32 | | 0.213 | 0.025 | G34 | | | | |
| 41 | Fourth Lens Element | 2.037 | 0.237 | T4 | Plastic | 1.535 | 55.690 | 0.538 |
| 42 | | -0.323 | 0.050 | G4F | | | | |
| 3 | Filter | Infinity | 0.210 | TF | | 1.517 | 64.167 | |
| | | Infinity | 0.046 | GFP | | | | |
| 4 | Image Plane | Infinity | | | | | | |

FIG. 46

| No. | K | $a_2$ | $a_4$ | $a_6$ | $a_8$ | $a_{10}$ |
|---|---|---|---|---|---|---|
| 11 | 0.000000E+00 | 0.000000E+00 | -4.860995E+00 | -1.229844E+03 | 3.954956E+04 | -6.734762E+05 |
| 12 | -5.827050E-01 | 0.000000E+00 | 2.034579E+01 | -2.121920E+04 | 2.854763E+06 | -2.359269E+08 |
| 21 | 4.967327E+00 | 0.000000E+00 | 2.504112E+01 | -8.694932E+03 | 1.498717E+06 | -1.513622E+08 |
| 22 | -5.268751E-02 | 0.000000E+00 | -4.424458E-01 | 1.676302E+03 | 1.787739E+03 | -5.571708E+06 |
| 31 | 0.000000E+00 | 0.000000E+00 | -6.842722E+01 | 1.424321E+03 | 2.249759E+04 | -6.741923E+06 |
| 32 | -8.801193E-01 | 0.000000E+00 | -8.585518E+01 | 2.613460E+03 | -1.011763E+05 | 3.862229E+06 |
| 41 | 4.736187E+01 | 0.000000E+00 | 2.192320E+01 | -1.196942E+02 | -5.678128E+04 | 3.859585E+06 |
| 42 | -3.140720E-01 | 0.000000E+00 | -3.443637E+01 | 1.319792E+03 | 1.284684E+04 | -2.307581E+06 |

| No. | $a_{12}$ | $a_{14}$ | $a_{16}$ | $a_{18}$ | $a_{20}$ |
|---|---|---|---|---|---|
| 11 | 5.860515E+06 | -2.021445E+07 | -1.020904E+07 | 0.000000E+00 | 0.000000E+00 |
| 12 | 1.148434E+10 | -2.961899E+11 | 3.145796E+12 | 0.000000E+00 | 0.000000E+00 |
| 21 | 8.560042E+09 | -2.554145E+11 | 3.166316E+12 | 0.000000E+00 | 0.000000E+00 |
| 22 | 3.352039E+08 | -8.531172E+09 | 8.315731E+10 | 0.000000E+00 | 0.000000E+00 |
| 31 | 4.126956E+08 | -1.048380E+10 | 8.544546E+10 | 6.888003E+11 | -1.072212E+13 |
| 32 | -9.814211E+07 | 1.512573E+09 | -1.408154E+10 | 7.589101E+10 | -1.897375E+11 |
| 41 | -1.256705E+08 | 2.498512E+09 | -3.161695E+10 | 2.334014E+11 | -7.544661E+11 |
| 42 | 8.692398E+07 | -1.734668E+09 | 2.000406E+10 | -1.263413E+11 | 3.379998E+11 |

FIG. 47

| Tenth Embodiment | | | | | | | |
|---|---|---|---|---|---|---|---|
| TTL=1.941 mm; EFL=0.325 mm; HFOV=64.000degrees; ImgH=0.234 mm; Fno=1.883 | | | | | | | |
| No. | | Radius of Curvature (mm) | Ape. Stop Distance Thickness Air Gap (mm) | Material | Refractive Index | Abbe No. | Focal Length (mm) |
| | Object | Infinity | Infinity | | | | |
| 11 | First Lens Element | 6.945 | 0.248 | T1 Plastic | 1.545 | 55.987 | -0.481 |
| 12 | | 0.250 | 0.429 | G12 | | | |
| 2 | Ape. Stop | Infinity | -0.027 | | | | |
| 21 | Second Lens Element | 0.390 | 0.484 | T2 Plastic | 1.535 | 55.690 | 0.386 |
| 22 | | -0.251 | 0.042 | G23 | | | |
| 31 | Third Lens Element | -1.344 | 0.157 | T3 Plastic | 1.661 | 20.373 | -0.519 |
| 32 | | 0.490 | 0.015 | G34 | | | |
| 41 | Fourth Lens Element | -1.198 | 0.157 | T4 Plastic | 1.535 | 55.690 | 0.676 |
| 42 | | -0.291 | 0.050 | G4F | | | |
| 3 | Filter | Infinity | 0.210 | TF | 1.517 | 64.167 | |
| | | Infinity | 0.178 | GFP | | | |
| 4 | Image Plane | Infinity | | | | | |

FIG. 48

| No. | K | $a_2$ | $a_4$ | $a_6$ | $a_8$ |
|---|---|---|---|---|---|
| 11 | 0.000000E+00 | 0.000000E+00 | -9.996060E+00 | 6.346555E+01 | -1.463850E+02 |
| 12 | 0.000000E+00 | 0.000000E+00 | -1.974587E+01 | -3.197623E+02 | 1.178405E+04 |
| 21 | 0.000000E+00 | 0.000000E+00 | -2.368491E+00 | -3.618990E+01 | 1.011620E+03 |
| 22 | 0.000000E+00 | 0.000000E+00 | 2.267956E+01 | -3.272336E+02 | 1.107485E+04 |
| 31 | 0.000000E+00 | 0.000000E+00 | -2.261225E+01 | -2.456562E+01 | 1.644995E+04 |
| 32 | 0.000000E+00 | 0.000000E+00 | -2.871447E+01 | 3.378603E+02 | 2.913117E+03 |
| 41 | 0.000000E+00 | 0.000000E+00 | 2.646778E+01 | -1.423732E+02 | 1.924849E+03 |
| 42 | 0.000000E+00 | 0.000000E+00 | 1.832994E+01 | 1.990060E+02 | -1.917099E+03 |
| No. | $a_{10}$ | $a_{12}$ | $a_{14}$ | $a_{16}$ | |
| 11 | 6.146065E+01 | 4.868663E+01 | -8.096130E+02 | -1.010310E+04 | |
| 12 | -1.366967E+05 | 1.088619E+04 | 4.428865E+05 | 7.667084E+04 | |
| 21 | -8.151828E+03 | -2.531808E+04 | 5.936903E+05 | 8.343605E+06 | |
| 22 | -5.764361E+04 | 4.309592E+02 | -9.341572E+03 | -4.049075E+05 | |
| 31 | -1.799205E+05 | -1.559872E+03 | -2.042868E+04 | -3.032918E+05 | |
| 32 | -5.181547E+04 | -1.039396E+03 | -5.988558E+04 | -2.464329E+03 | |
| 41 | -2.270389E+04 | -2.756286E+02 | -3.624515E+04 | -7.256807E+05 | |
| 42 | 8.324544E+03 | -8.583660E+02 | -7.273612E+03 | -5.049927E+05 | |

FIG. 49

| Eleventh Embodiment | | | | | | | |
|---|---|---|---|---|---|---|---|
| TTL=1.272 mm; EFL=0.207 mm; HFOV=65.000degrees; ImgH=0.132 mm; Fno=2.000 | | | | | | | |
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 2.991 | 0.229 | T1 | Plastic | 1.535 | 55.690 | -0.200 |
| 12 | | 0.101 | 0.144 | G12 | | | | |
| 2 | Ape. Stop | Infinity | -0.005 | | | | | |
| 21 | Second Lens Element | 0.674 | 0.195 | T2 | Plastic | 1.535 | 55.690 | 0.305 |
| 22 | | -0.194 | 0.020 | G23 | | | | |
| 31 | Third Lens Element | 0.575 | 0.100 | T3 | Plastic | 1.661 | 20.373 | -1.142 |
| 32 | | 0.305 | 0.034 | G34 | | | | |
| 41 | Fourth Lens Element | 1.514 | 0.131 | T4 | Plastic | 1.535 | 55.690 | 0.421 |
| 42 | | -0.258 | 0.050 | G4F | | | | |
| 3 | Filter | Infinity | 0.210 | TF | | 1.517 | 64.167 | |
| | | Infinity | 0.163 | GFP | | | | |
| 4 | Image Plane | Infinity | | | | | | |

FIG. 50

| No. | K | $a_2$ | $a_4$ | $a_6$ | $a_8$ | $a_{10}$ |
|---|---|---|---|---|---|---|
| 11 | 0.000000E+00 | 0.000000E+00 | -1.284742E+01 | -4.241716E+02 | 7.665823E+03 | -4.565861E+04 |
| 12 | -1.140669E+00 | 0.000000E+00 | 3.100591E+01 | -2.145554E+04 | 3.289562E+06 | -3.035905E+08 |
| 21 | -9.531077E+00 | 0.000000E+00 | 1.674556E+01 | -7.821815E+03 | 1.216406E+06 | -1.047278E+08 |
| 22 | -2.961253E-02 | 0.000000E+00 | 2.590304E+00 | -2.187285E+02 | 2.037226E+05 | -1.863788E+07 |
| 31 | 0.000000E+00 | 0.000000E+00 | -5.783145E+01 | -1.637837E+03 | 3.958358E+05 | -2.339367E+07 |
| 32 | -8.179160E-01 | 0.000000E+00 | -8.279999E+01 | 1.926608E+03 | -1.193069E+04 | -5.797178E+05 |
| 41 | -1.451944E+02 | 0.000000E+00 | 9.655632E+00 | -1.868397E+02 | -8.974455E+04 | 8.507423E+06 |
| 42 | -1.069052E+00 | 0.000000E+00 | 6.555406E+00 | 1.853540E+02 | -1.212936E+04 | 2.280582E+05 |

| No. | $a_{12}$ | $a_{14}$ | $a_{16}$ | $a_{18}$ | $a_{20}$ |
|---|---|---|---|---|---|
| 11 | 0.000000E+00 | 0.000000E+00 | 0.000000E+00 | 0.000000E+00 | 0.000000E+00 |
| 12 | 1.575555E+10 | -4.233692E+11 | 4.585677E+12 | 0.000000E+00 | 0.000000E+00 |
| 21 | 4.666559E+09 | -9.270192E+10 | 4.167632E+11 | 0.000000E+00 | 0.000000E+00 |
| 22 | 8.076012E+08 | -1.718873E+10 | 1.464622E+11 | 0.000000E+00 | 0.000000E+00 |
| 31 | 5.353301E+08 | 4.014542E+09 | -4.653342E+11 | 8.917463E+12 | -5.758153E+13 |
| 32 | 1.398278E+07 | 4.664488E+07 | -6.401185E+09 | 9.537154E+10 | -4.640464E+11 |
| 41 | -3.467819E+08 | 7.890782E+09 | -1.049283E+11 | 7.668540E+11 | -2.391929E+12 |
| 42 | 6.643535E+06 | -3.718606E+08 | 6.893951E+09 | -5.883747E+10 | 1.927105E+11 |

FIG. 51

| Twelfth Embodiment ||||||||
|---|---|---|---|---|---|---|---|
| TTL=1.283 mm; EFL=0.408 mm; HFOV=75.000degrees; ImgH=0.377 mm; Fno=2.000 ||||||||
| No. | | Radius of Curvature (mm) | Ape. Stop Distance Thickness Air Gap (mm) | | Material | Refractive Index | Abbe No. | Focal Length (mm) |
| | Object | Infinity | Infinity | | | | | |
| 11 | First Lens Element | 0.313 | 0.120 | T1 | Plastic | 1.535 | 55.690 | -0.544 |
| 12 | | 0.131 | 0.160 | G12 | | | | |
| 2 | Ape. Stop | Infinity | -0.008 | | | | | |
| 21 | Second Lens Element | 0.649 | 0.212 | T2 | Plastic | 1.535 | 55.690 | 0.311 |
| 22 | | -0.199 | 0.015 | G23 | | | | |
| 31 | Third Lens Element | 0.788 | 0.112 | T3 | Plastic | 1.661 | 20.373 | -0.496 |
| 32 | | 0.220 | 0.034 | G34 | | | | |
| 41 | Fourth Lens Element | 1.634 | 0.215 | T4 | Plastic | 1.535 | 55.690 | 0.479 |
| 42 | | -0.291 | 0.050 | G4F | | | | |
| 3 | Filter | Infinity | 0.210 | TF | | 1.517 | 64.167 | |
| | | Infinity | 0.163 | GFP | | | | |
| 4 | Image Plane | Infinity | | | | | | |

FIG. 52

| No. | K | $a_2$ | $a_4$ | $a_6$ | $a_8$ | $a_{10}$ |
|---|---|---|---|---|---|---|
| 11 | 0.000000E+00 | 0.000000E+00 | -1.729553E+01 | -2.909894E+02 | 5.730349E+03 | -3.565859E+04 |
| 12 | -4.483494E-01 | 0.000000E+00 | -2.733718E+01 | -4.697310E+03 | 6.871124E+05 | -7.690356E+07 |
| 21 | 5.939653E+00 | 0.000000E+00 | 2.525231E+01 | -1.422475E+04 | 3.204174E+06 | -4.040194E+08 |
| 22 | -2.599951E-02 | 0.000000E+00 | 3.117222E+00 | 1.661989E+03 | -1.502859E+05 | 9.163959E+06 |
| 31 | 0.000000E+00 | 0.000000E+00 | -7.635174E+01 | 4.864751E+03 | -4.086957E+05 | 2.327120E+07 |
| 32 | -7.496875E-01 | 0.000000E+00 | -7.017779E+01 | 2.271630E+03 | -7.367683E+04 | 1.223140E+06 |
| 41 | 2.357627E+01 | 0.000000E+00 | 4.660555E+00 | 6.992064E+02 | -6.213005E+04 | 1.800795E+06 |
| 42 | -3.593488E-01 | 0.000000E+00 | -2.348707E+01 | 3.216617E+03 | -2.013582E+05 | 7.692308E+06 |

| No. | $a_{12}$ | $a_{14}$ | $a_{16}$ | $a_{18}$ | $a_{20}$ |
|---|---|---|---|---|---|
| 11 | 0.000000E+00 | 0.000000E+00 | 0.000000E+00 | 0.000000E+00 | 0.000000E+00 |
| 12 | 4.909891E+09 | -1.598590E+11 | 2.072917E+12 | 0.000000E+00 | 0.000000E+00 |
| 21 | 2.861988E+10 | -1.071865E+12 | 1.653363E+13 | 0.000000E+00 | 0.000000E+00 |
| 22 | -2.911785E+08 | 4.232308E+09 | -1.626607E+10 | 0.000000E+00 | 0.000000E+00 |
| 31 | -7.175232E+08 | 8.511332E+09 | 9.178872E+10 | -3.386909E+12 | 2.451012E+13 |
| 32 | 1.439118E+07 | -1.100197E+09 | 2.100890E+10 | -1.800085E+11 | 5.908599E+11 |
| 41 | -1.212096E+07 | -5.022807E+08 | 1.325521E+10 | -1.284859E+11 | 4.623932E+11 |
| 42 | -1.828237E+08 | 2.699709E+09 | -2.378248E+10 | 1.126959E+11 | -2.167755E+11 |

FIG. 53

| Embodiment | 1 | 2 | 3 | 4 | 5 | 6 | 7 | 8 | 9 | 10 | 11 | 12 |
|---|---|---|---|---|---|---|---|---|---|---|---|---|
| T1 | 0.114 | 0.130 | 0.234 | 0.197 | 0.139 | 0.115 | 0.247 | 0.196 | 0.208 | 0.248 | 0.229 | 0.120 |
| G12 | 0.395 | 0.487 | 0.380 | 0.199 | 0.450 | 0.153 | 0.385 | 0.328 | 0.147 | 0.402 | 0.140 | 0.152 |
| T2 | 0.199 | 0.194 | 0.193 | 0.348 | 0.244 | 0.263 | 0.311 | 0.361 | 0.251 | 0.484 | 0.195 | 0.212 |
| G23 | 0.014 | 0.042 | 0.066 | 0.126 | 0.057 | 0.022 | 0.017 | 0.059 | 0.045 | 0.042 | 0.020 | 0.015 |
| T3 | 0.015 | 0.129 | 0.090 | 0.117 | 0.138 | 0.107 | 0.145 | 0.171 | 0.100 | 0.157 | 0.100 | 0.112 |
| G34 | 0.019 | 0.054 | 0.030 | 0.020 | 0.037 | 0.034 | 0.015 | 0.040 | 0.025 | 0.015 | 0.034 | 0.034 |
| T4 | 0.097 | 0.222 | 0.202 | 0.126 | 0.192 | 0.270 | 0.195 | 0.189 | 0.237 | 0.157 | 0.131 | 0.215 |
| G4F | 0.050 | 0.100 | 0.050 | 0.070 | 0.050 | 0.050 | 0.050 | 0.050 | 0.050 | 0.050 | 0.050 | 0.050 |
| TF | 0.210 | 0.210 | 0.210 | 0.210 | 0.210 | 0.210 | 0.210 | 0.210 | 0.210 | 0.210 | 0.210 | 0.210 |
| GFP | 0.059 | 0.177 | 0.121 | 0.048 | 0.322 | 0.093 | 0.127 | 0.137 | 0.046 | 0.178 | 0.163 | 0.163 |
| BFL | 0.319 | 0.487 | 0.381 | 0.328 | 0.582 | 0.353 | 0.387 | 0.397 | 0.306 | 0.438 | 0.423 | 0.423 |
| EFL | 0.435 | 0.494 | 0.341 | 0.240 | 0.378 | 0.436 | 0.388 | 0.226 | 0.553 | 0.325 | 0.207 | 0.408 |
| TTL | 1.172 | 1.744 | 1.576 | 1.460 | 1.839 | 1.316 | 1.701 | 1.743 | 1.318 | 1.941 | 1.272 | 1.283 |
| TL | 0.853 | 1.257 | 1.196 | 1.132 | 1.257 | 0.964 | 1.314 | 1.345 | 1.012 | 1.504 | 0.849 | 0.859 |
| ALT | 0.425 | 0.674 | 0.719 | 0.788 | 0.713 | 0.754 | 0.898 | 0.918 | 0.796 | 1.045 | 0.655 | 0.658 |
| AAG | 0.428 | 0.583 | 0.476 | 0.345 | 0.544 | 0.210 | 0.416 | 0.427 | 0.216 | 0.459 | 0.194 | 0.201 |
| ImgH | 0.273 | 0.449 | 0.288 | 0.280 | 0.352 | 0.347 | 0.311 | 0.132 | 0.280 | 0.234 | 0.132 | 0.377 |
| HFOV | 64.000 | 64.000 | 72.000 | 55.000 | 64.000 | 55.000 | 64.000 | 55.000 | 55.000 | 64.000 | 65.000 | 75.000 |
| Tmax | 0.199 | 0.222 | 0.234 | 0.348 | 0.244 | 0.270 | 0.311 | 0.361 | 0.251 | 0.484 | 0.229 | 0.215 |
| Tmax2 | 0.114 | 0.194 | 0.202 | 0.197 | 0.192 | 0.263 | 0.247 | 0.196 | 0.237 | 0.248 | 0.195 | 0.212 |
| Tmin | 0.015 | 0.129 | 0.090 | 0.117 | 0.138 | 0.107 | 0.145 | 0.171 | 0.100 | 0.157 | 0.100 | 0.112 |
| Gmax | 0.395 | 0.487 | 0.380 | 0.199 | 0.450 | 0.153 | 0.385 | 0.328 | 0.147 | 0.402 | 0.140 | 0.152 |
| Fno | 2.000 | 2.433 | 2.000 | 2.000 | 2.304 | 2.000 | 2.000 | 2.104 | 2.000 | 1.883 | 2.000 | 2.000 |
| Tavg | 0.106 | 0.169 | 0.180 | 0.197 | 0.178 | 0.189 | 0.224 | 0.229 | 0.199 | 0.261 | 0.164 | 0.165 |
| Tmin2 | 0.097 | 0.130 | 0.193 | 0.126 | 0.139 | 0.115 | 0.195 | 0.189 | 0.208 | 0.157 | 0.131 | 0.120 |

FIG. 54

| Embodiment | 1 | 2 | 3 | 4 | 5 | 6 | 7 | 8 | 9 | 10 | 11 | 12 |
|---|---|---|---|---|---|---|---|---|---|---|---|---|
| Tmax+Tmin (μm) | 213.615 | 350.957 | 323.859 | 464.797 | 382.282 | 376.412 | 455.804 | 532.405 | 351.384 | 640.130 | 328.840 | 326.282 |
| HFOV/(EFL+TL) | 49.684 | 36.554 | 46.856 | 40.073 | 39.149 | 39.289 | 37.598 | 35.005 | 35.138 | 35.001 | 61.573 | 59.175 |
| EFL/(T2+G34) | 1.998 | 1.997 | 1.525 | 0.653 | 1.344 | 1.468 | 1.192 | 0.564 | 2.000 | 0.652 | 0.902 | 1.661 |
| (EFL+BFL)/Gmax | 1.907 | 2.015 | 1.900 | 2.850 | 2.132 | 5.140 | 2.014 | 1.899 | 5.861 | 1.899 | 4.514 | 5.459 |
| HFOV/(Tmax+Tmax2) | 204.101 | 154.012 | 165.015 | 100.991 | 146.693 | 103.268 | 114.713 | 98.637 | 112.633 | 87.493 | 153.181 | 175.931 |
| (G12+T2)/(T3+G34) | 17.921 | 3.723 | 4.771 | 4.005 | 3.976 | 2.957 | 4.361 | 3.268 | 3.184 | 5.165 | 2.500 | 2.500 |
| HFOV/(TTL*Fno) | 27.301 | 15.081 | 22.836 | 18.830 | 15.105 | 20.889 | 18.810 | 15.001 | 20.858 | 17.507 | 25.553 | 29.236 |
| ALT/(G12+T2) | 0.714 | 0.991 | 1.255 | 1.440 | 1.026 | 1.811 | 1.291 | 1.331 | 2.000 | 1.180 | 1.955 | 1.809 |
| (BFL+G34)/T4 | 3.495 | 2.439 | 2.034 | 2.751 | 3.225 | 1.434 | 2.059 | 2.312 | 1.398 | 2.892 | 3.499 | 2.130 |
| ALT/(G23+T3+G34) | 8.936 | 3.005 | 3.861 | 3.005 | 3.080 | 4.626 | 5.087 | 3.395 | 4.696 | 4.887 | 4.252 | 4.100 |
| (ALT+EFL)/AAG | 2.007 | 2.006 | 2.225 | 2.982 | 2.005 | 5.676 | 3.088 | 2.677 | 6.240 | 2.985 | 4.451 | 5.299 |
| EFL/T1 | 3.799 | 3.808 | 1.457 | 1.220 | 2.727 | 3.797 | 1.570 | 1.150 | 2.661 | 1.311 | 0.905 | 3.391 |
| (T3+G34+T4+BFL)/T1 | 3.919 | 6.878 | 3.003 | 3.005 | 6.845 | 6.645 | 3.001 | 4.058 | 3.216 | 3.089 | 3.006 | 6.512 |
| TTL/(T1+T2+T4) | 2.858 | 3.199 | 2.504 | 2.177 | 3.199 | 2.033 | 2.260 | 2.334 | 1.894 | 2.186 | 2.292 | 2.347 |
| (G12+T2+BFL)/AAG | 2.132 | 2.005 | 2.002 | 2.540 | 2.347 | 3.667 | 2.600 | 2.543 | 3.258 | 2.884 | 3.916 | 3.912 |
| (Gmax+BFL)/Tavg | 6.728 | 5.781 | 4.231 | 2.677 | 5.795 | 2.684 | 3.438 | 3.162 | 2.275 | 3.215 | 3.437 | 3.497 |
| (ImgH+EFL)/Tmin2 | 7.330 | 7.269 | 3.256 | 4.114 | 5.267 | 6.819 | 3.585 | 1.894 | 4.009 | 3.570 | 2.594 | 6.525 |

FIG. 55

OPTICAL IMAGING LENS

BACKGROUND OF THE INVENTION

1. Field of the Invention

The present invention generally relates to an optical imaging lens. Specifically speaking, the present invention is directed to an optical imaging lens for using in a portable electronic device such as a mobile phone, a camera, a tablet personal computer, or a personal digital assistant (PDA) for taking pictures or for recording videos. Since the optical imaging lens of the present invention has small volume and large field of view, it can also be applied to medical equipment such as endoscopes.

2. Description of the Prior Art

In recent years, optical imaging lens have evolved continuously. In addition to requiring lens elements to be light and short, it is becoming more and more important to improve the imaging quality of the optical imaging lens, such as aberration and chromatic aberration. However, in the design of optical imaging lens, it is not just simply reduce the lens element with good imaging quality in equal proportion, and the optical imaging lens with good imaging quality and miniaturization can therefore be produced. The design process involves not only the material characteristics, lens element thickness or air gap configuration, but also the practical problems of production surface such as production and assembly yield, especially the small lens element and slight dimensional variation will affect the imaging quality of the whole optical system. Therefore, it is not easy to provide a miniaturized optical imaging lens with good imaging quality and large field of view.

SUMMARY OF THE INVENTION

In light of the above, the present invention proposes an optical imaging lens of four lens elements which has larger image field of view and good imaging quality. The optical imaging lens of four lens elements of the present invention from an object side to an image side in order along an optical axis has a first lens element, a second lens element, a third lens element and a fourth lens element respectively has an object-side surface which faces toward the object side to allow imaging rays to pass through as well as an image-side surface which faces toward the image side to allow the imaging rays to pass through.

In one embodiment of the present invention, the first lens element has negative refracting power, and an optical axis region of the object-side surface of the first lens element is convex, the third lens has negative refracting power, an optical axis region of the image-side surface of the fourth lens element is convex, lens elements included by the optical imaging lens are only the four lens elements described above and the optical imaging lens satisfies the following relationships, and the optical imaging lens satisfies the relationship of $Tmax+Tmin \leq 700.00$ μm.

In another embodiment of the present invention, the first lens element has negative refracting power, and an optical axis region of the object-side surface of the first lens element is convex, a periphery region of the image-side surface of the second lens element is convex, an optical axis region of the image-side surface of the fourth lens element is convex, lens elements included by the optical imaging lens are only the four lens elements described above and the optical imaging lens satisfies the following relationships, and the optical imaging lens satisfies the relationship of $Tmax+Tmin \leq 700.00$ μm.

In another embodiment of the present invention, the first lens element has negative refracting power, a periphery region of the object-side surface of the second lens element is convex, and a periphery region of the image-side surface of the second lens element is convex, an optical axis region of the image-side surface of the fourth lens element is convex, lens elements included by the optical imaging lens are only the four lens elements described above and the optical imaging lens satisfies the following relationships, and the optical imaging lens satisfies the relationship of $Tmax+Tmin \leq 700.00$ μm.

In the optical imaging lens of the present invention, the embodiments may also selectively satisfy the following optical relationships:

$HFOV/(EFL+TL) \geq 35.000$ degrees/mm;
$EFL/(T2+G34) \leq 2.000$;
$(EFL+BFL)/Gmax \geq 1.800$;
$HFOV/(Tmax+Tmax2) \geq 85.000$ degrees/mm;
$(G12+T2)/(T3+G34) \geq 2.500$;
$HFOV/(TTL*Fno) \geq 15.000$ degrees/mm;
$T4 > G23$;
$ALT/(G12+T2) \leq 2.000$;
$(BFL+G34)/T4 \leq 3.500$;
$ALT/(G23+T3+G34) \geq 3.000$;
$(ALT+EFL)/AAG \geq 2.000$;
$T1 > T3$;
$EFL/T1 \leq 3.900$;
$(T3+G34+T4+BFL)/T1 \geq 3.000$;
$TTL/(T1+T2+T4) \leq 3.200$;
$ALT > G12$;
$(G12+T2+BFL)/AAG \geq 2.000$;
$(Gmax+BFL)/Tavg \geq 2.200$; and
$(ImgH+EFL)/Tmin2 \geq 1.800$.

In the present invention, T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, G34 is an air gap between the third lens element and the fourth lens element along the optical axis, ALT is a sum of the thicknesses of four lens elements from the first lens element to the fourth lens element along the optical axis, TL is a distance from the object-side surface of the first lens element to the image-side surface of the fourth lens element along the optical axis, TTL is the distance from the object-side surface of the first lens element to an image plane along the optical axis, BFL is a distance from the image-side surface of the fourth lens element to an image plane along the optical axis, AAG is a sum of three air gaps from the first lens element to the fourth lens element along the optical axis, EFL is an effective focal length of the optical imaging lens, ImgH is an image height of the optical imaging lens, and Fno is a f-number of the optical imaging lens.

Besides, an Abbe number of the first lens element is V1; an Abbe number of the second lens element is V2; an Abbe number of the third lens element is V3; an Abbe number of the fourth lens element is V4.

In the present invention, further defining: Tmax is the maximum value of thicknesses of the four lens elements from the first lens element to the fourth lens element along the optical axis, that is, the maximum value of T1, T2, T3, and T4; Tmax2 is the second largest value of thicknesses of the four lens elements from the first lens element to the fourth lens element along the optical axis, that is, the second largest value of T1, T2, T3, and T4; Tmin is the minimum value of thicknesses of the four lens elements from the first lens element to the fourth lens element along the optical axis, that is, the minimum value of T1, T2, T3, and T4; Tmin2 is the second smallest value of thicknesses of the four lens elements from the first lens element to the fourth lens element along the optical axis, that is, the second smallest value of T1, T2, T3, and T4; Tavg is the average value of thicknesses of the four lens elements from the first lens element to the fourth lens element along the optical axis, that is, the average value of T1, T2, T3, and T4; Gmax is the maximum value of the three air gaps from the first lens element to the fourth lens element along the optical axis, that is, the maximum value of G12, G23 and G34.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-5 illustrate the methods for determining the surface shapes and for determining optical axis region or periphery region of one lens element.

FIG. 6 illustrates a first embodiment of the optical imaging lens of the present invention.

FIG. 7A illustrates the longitudinal spherical aberration on the image plane of the first embodiment.

FIG. 7B illustrates the field curvature aberration on the sagittal direction of the first embodiment.

FIG. 7C illustrates the field curvature aberration on the tangential direction of the first embodiment.

FIG. 7D illustrates the distortion of the first embodiment.

FIG. 8 illustrates a second embodiment of the optical imaging lens of the present invention.

FIG. 9A illustrates the longitudinal spherical aberration on the image plane of the second embodiment.

FIG. 9B illustrates the field curvature aberration on the sagittal direction of the second embodiment.

FIG. 9C illustrates the field curvature aberration on the tangential direction of the second embodiment.

FIG. 9D illustrates the distortion of the second embodiment.

FIG. 10 illustrates a third embodiment of the optical imaging lens of the present invention.

FIG. 11A illustrates the longitudinal spherical aberration on the image plane of the third embodiment.

FIG. 11B illustrates the field curvature aberration on the sagittal direction of the third embodiment.

FIG. 11C illustrates the field curvature aberration on the tangential direction of the third embodiment.

FIG. 11D illustrates the distortion of the third embodiment.

FIG. 14 illustrates a fifth embodiment of the optical imaging lens of the present invention.

FIG. 15A illustrates the longitudinal spherical aberration on the image plane of the fifth embodiment.

FIG. 15B illustrates the field curvature aberration on the sagittal direction of the fifth embodiment.

FIG. 15C illustrates the field curvature aberration on the tangential direction of the fifth embodiment.

FIG. 15D illustrates the distortion of the fifth embodiment.

FIG. 16 illustrates a sixth embodiment of the optical imaging lens of the present invention.

FIG. 17A illustrates the longitudinal spherical aberration on the image plane of the sixth embodiment.

FIG. 17B illustrates the field curvature aberration on the sagittal direction of the sixth embodiment.

FIG. 17C illustrates the field curvature aberration on the tangential direction of the sixth embodiment.

FIG. 17D illustrates the distortion of the sixth embodiment.

FIG. 18 illustrates a seventh embodiment of the optical imaging lens of the present invention.

FIG. 19A illustrates the longitudinal spherical aberration on the image plane of the seventh embodiment.

FIG. 19B illustrates the field curvature aberration on the sagittal direction of the seventh embodiment.

FIG. 19C illustrates the field curvature aberration on the tangential direction of the seventh embodiment.

FIG. 19D illustrates the distortion of the seventh embodiment.

FIG. 20 illustrates an eighth embodiment of the optical imaging lens of the present invention.

FIG. 21A illustrates the longitudinal spherical aberration on the image plane of the eighth embodiment.

FIG. 21B illustrates the field curvature aberration on the sagittal direction of the eighth embodiment.

FIG. 21C illustrates the field curvature aberration on the tangential direction of the eighth embodiment.

FIG. 21D illustrates the distortion of the eighth embodiment.

FIG. 24 illustrates a tenth embodiment of the optical imaging lens of the present invention.

FIG. 25A illustrates the longitudinal spherical aberration on the image plane of the tenth embodiment.

FIG. 25B illustrates the field curvature aberration on the sagittal direction of the tenth embodiment.

FIG. 25C illustrates the field curvature aberration on the tangential direction of the tenth embodiment.

FIG. 25D illustrates the distortion of the tenth embodiment.

FIG. 28 illustrates a twelfth embodiment of the optical imaging lens of the present invention.

FIG. 29A illustrates the longitudinal spherical aberration on the image plane of the twelfth embodiment.

FIG. 29B illustrates the field curvature aberration on the sagittal direction of the twelfth embodiment.

FIG. 29C illustrates the field curvature aberration on the tangential direction of the twelfth embodiment.

FIG. 29D illustrates the distortion of the twelfth embodiment.

FIG. 30 shows the optical data of the first embodiment of the optical imaging lens.

FIG. 31 shows the aspheric surface data of the first embodiment.

FIG. 32 shows the optical data of the second embodiment of the optical imaging lens.

FIG. 33 shows the aspheric surface data of the second embodiment.

FIG. 34 shows the optical data of the third embodiment of the optical imaging lens.

FIG. 35 shows the aspheric surface data of the third embodiment.

FIG. 36 shows the optical data of the fourth embodiment of the optical imaging lens.

FIG. 37 shows the aspheric surface data of the fourth embodiment.

FIG. 38 shows the optical data of the fifth embodiment of the optical imaging lens.

FIG. 39 shows the aspheric surface data of the fifth embodiment.

FIG. 40 shows the optical data of the sixth embodiment of the optical imaging lens.

FIG. 41 shows the aspheric surface data of the sixth embodiment.

FIG. 42 shows the optical data of the seventh embodiment of the optical imaging lens.

FIG. 43 shows the aspheric surface data of the seventh embodiment.

FIG. 44 shows the optical data of the eighth embodiment of the optical imaging lens.

FIG. 45 shows the aspheric surface data of the eighth embodiment.

FIG. 46 shows the optical data of the ninth embodiment of the optical imaging lens.

FIG. 47 shows the aspheric surface data of the ninth embodiment.

FIG. 48 shows the optical data of the tenth embodiment of the optical imaging lens.

FIG. 49 shows the aspheric surface data of the tenth embodiment.

FIG. 50 shows the optical data of the eleventh embodiment of the optical imaging lens.

FIG. 51 shows the aspheric surface data of the eleventh embodiment.

FIG. 52 shows the optical data of the twelfth embodiment of the optical imaging lens.

FIG. 53 shows the aspheric surface data of the twelfth embodiment.

FIG. 54 shows some important ratios in the embodiments.

FIG. 55 shows some important ratios in the embodiments.

DETAILED DESCRIPTION

The terms "optical axis region", "periphery region", "concave", and "convex" used in this specification and claims should be interpreted based on the definition listed in the specification by the principle of lexicographer.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
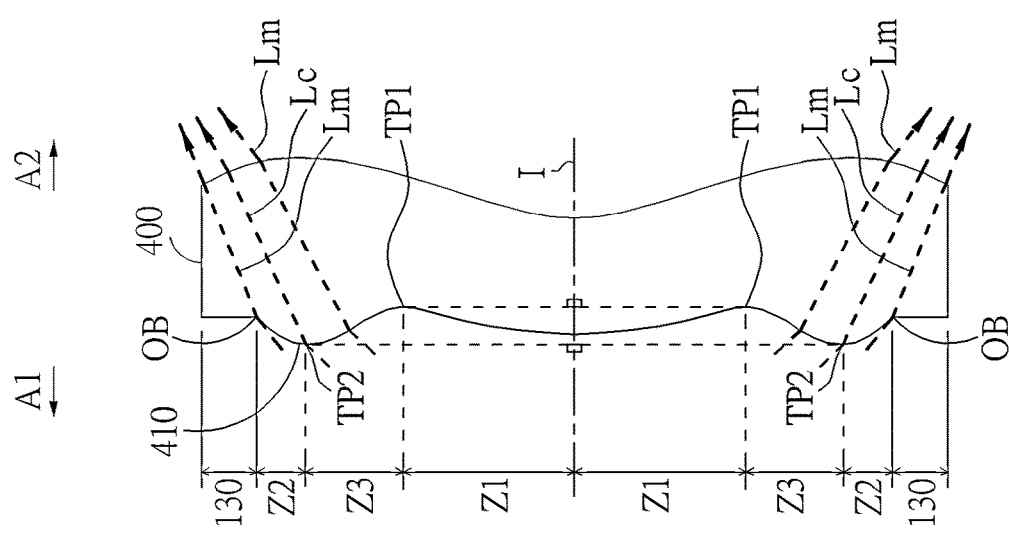

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
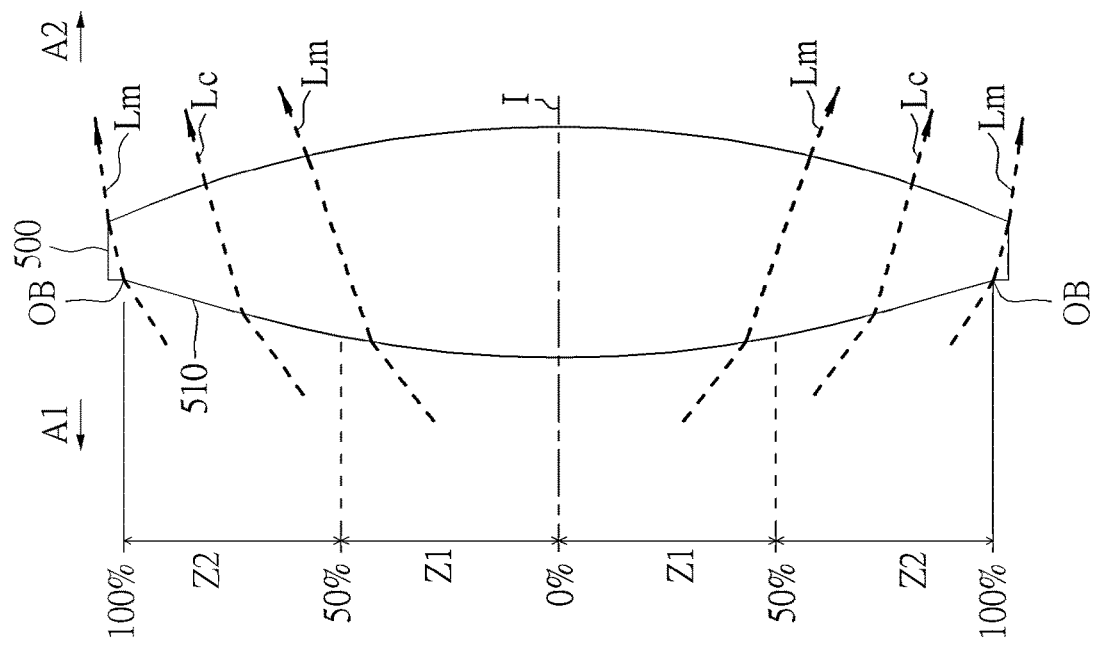
Figure 3:
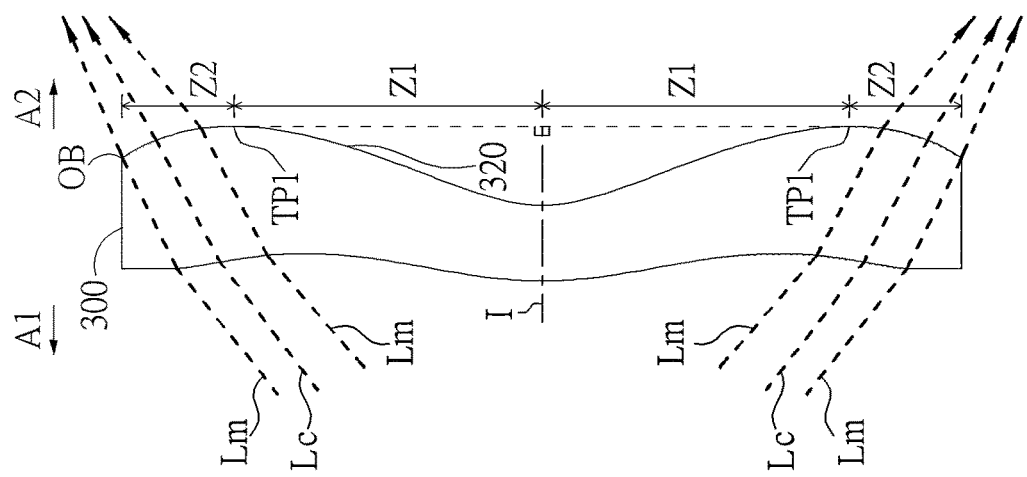

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

As shown in FIG. 6, the optical imaging lens 1 of four lens elements of the present invention, sequentially located from an object side A1 (where an object is located) to an image side A2 along an optical axis I, has a first lens element 10, an aperture stop (ape. stop) 2, a second lens element 20, a third lens element 30, a fourth lens element 40, and an image plane 4. Generally speaking, the first lens element 10, the second lens element 20, the third lens element 30 and the fourth lens element 40 may be made of a transparent plastic material but the present invention is not limited to this, and each has an appropriate refracting power. In the present invention, lens elements having refracting power included by the optical imaging lens 1 are only the four lens elements described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 2 disposed in an appropriate position. In FIG. 6, the aperture stop 2 is disposed between the first lens element 10 and the second lens element 20. When light emitted or reflected by an object (not shown) which is located at the object side A1 enters the optical imaging lens 1 of the present invention, it forms a clear and sharp image on the image plane 4 at the image side A2 after passing through the first lens element 10, the aperture stop 2, the second lens element 20, the third lens element 30, the fourth lens element 40 and the filter 3. In one embodiment of the present invention, the optional filter 3 may be placed between the fourth lens element 40 and the image plane 4, and it may be a filter of various suitable functions, for example, the filter 3 may be an infrared cut-off filter (IR cut-off filter), for prohibiting the infrared rays from being transmitted to the image plane 4 to affect the image quality.

Each lens element in the optical imaging lens 1 of the present invention has an object-side surface facing toward the object side A1 as well as an image-side surface facing toward the image side A2. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42. In addition, each object-side surface and image-side surface in the optical imaging lens 1 of the present invention has an optical axis region and a periphery region.

Each lens element in the optical imaging lens 1 of the present invention further has a thickness T along the optical axis I. For example, the first lens element 10 has a first lens element thickness T1, the second lens element 20 has a second lens element thickness T2, the third lens element 30 has a third lens element thickness T3, the fourth lens element 40 has a fourth lens element thickness T4. Therefore, the sum of the thicknesses of four lens elements from the first lens element 10 to the fourth lens element 40 in the optical imaging lens 1 along the optical axis I is ALT=T1+T2+T3+T4.

In addition, between two adjacent lens elements in the optical imaging lens 1 of the present invention there may be an air gap along the optical axis I. For example, there is an air gap G12 between the first lens element 10 and the second lens element 20, an air gap G23 between the second lens element 20 and the third lens element 30, an air gap G34 between the third lens element 30 and the fourth lens element 40. Therefore, the sum of three air gaps from the first lens element 10 to the fourth lens element 40 along the optical axis I is AAG=G12+G23+G34.

In addition, a distance from the object-side surface 11 of the first lens element 10 to the image plane 4 along the optical axis I is TTL, namely a system length of the optical imaging lens 1; an effective focal length of the optical imaging lens 1 is EFL; a distance from the object-side surface 11 of the first lens element 10 to the image-side surface 42 of the fourth lens element 40 along the optical axis I is TL; HFOV stands for the half field of view which is half of the field of view of the entire optical imaging lens 1; ImgH is an image height of the optical imaging lens 1, and Fno is a f-number of the optical imaging lens 1.

When the filter 3 is placed between the fourth lens element 40 and the image plane 4, an air gap between the fourth lens element 40 and the filter 3 along the optical axis I is G4F; a thickness of the filter 3 along the optical axis I is TF; an air gap between the filter 3 and the image plane 4 along the optical axis I is GFP; and a distance from the image-side surface 42 of the fourth lens element 40 to the image plane 4 along the optical axis I is BFL, namely a back focal length of the optical imaging lens 1. Therefore, BFL=G4F+TF+GFP.

Furthermore, a focal length of the first lens element 10 is f1; a focal length of the second lens element 20 is f2; a focal length of the third lens element 30 is f3; a focal length of the fourth lens element 40 is f4; a refractive index of the first lens element 10 is n1; a refractive index of the second lens element 20 is n2; a refractive index of the third lens element 30 is n3; a refractive index of the fourth lens element 40 is n4; an Abbe number of the first lens element 10 is V1; an Abbe number of the second lens element 20 is V2; an Abbe number of the third lens element 30 is V3; and an Abbe number of the fourth lens element 40 is V4.

In the present invention, further defining: Tmax is the maximum value of thicknesses of the four lens elements from the first lens element 10 to the fourth lens element 40 along the optical axis I, that is, the maximum value of T1, T2, T3, and T4; Tmax2 is the second largest value of thicknesses of the four lens elements from the first lens element 10 to the fourth lens element 40 along the optical axis I, that is, the second largest value of T1, T2, T3, and T4; Tmin is the minimum value of the thicknesses of the four lens elements from the first lens element 10 to the fourth lens element 40 along the optical axis I, that is, the minimum value of T1, T2, T3, and T4; Tmin2 is the second smallest value of thicknesses of the four lens elements from the first lens element 10 to the fourth lens element 40 along the optical axis I, that is, the second smallest value of T1, T2, T3, and T4; Tavg is the average value of thicknesses of the four lens elements from the first lens element 10 to the fourth lens element 40 along the optical axis I, that is, the average value of T1, T2, T3, and T4; Gmax is the maximum value of the three air gaps from the first lens element 10 to the fourth lens element 40 along the optical axis I, that is, the maximum value of G12, G23 and G34.

First Embodiment

Please refer to FIG. 6 which illustrates the first embodiment of the optical imaging lens 1 of the present invention. Please refer to FIG. 7A for the longitudinal spherical aberration on the image plane 4 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion in each embodiment stands for "image height" (ImgH), and the image height in the first embodiment is 0.273 mm.

Lens elements in the optical imaging lens 1 of the first embodiment are only the four lens elements 10, 20, 30 and 40 with refracting power. The optical imaging lens 1 also has an aperture stop 2 and an image plane 4. The aperture stop 2 is provided between the first lens element 10 and the second lens element 20.

The first lens element 10 has negative refracting power. An optical axis region 13 of the object-side surface 11 of the first lens element 10 is convex, and a periphery region 14 of the object-side surface 11 of the first lens element 10 is concave. An optical axis region 16 of the image-side surface 12 of the first lens element 10 is concave, and a periphery region 17 of the image-side surface 12 of the first lens element 10 is concave. Besides, both the object-side surface 11 and the image-side surface 12 of the first lens element 10 are aspheric surfaces, but it is not limited thereto.

The second lens element 20 has positive refracting power. An optical axis region 23 of the object-side surface 21 of the second lens element 20 is convex, and a periphery region 24 of the object-side surface 21 of the second lens element 20 is convex. An optical axis region 26 of the image-side surface 22 of the second lens element 20 is convex, and a periphery region 27 of the image-side surface 22 of the second lens element 20 is convex. Besides, both the object-side surface 21 and the image-side surface 22 of the second lens element 20 are aspheric surfaces, but it is not limited thereto.

The third lens element 30 has negative refracting power. An optical axis region 33 of the object-side surface 31 of the third lens element 30 is concave, and a periphery region 34 of the object-side surface 31 of the third lens element 30 is concave. An optical axis region 36 of the image-side surface 32 of the third lens element 30 is concave, and a periphery region 37 of the image-side surface 32 of the third lens element 30 is concave. Besides, both the object-side surface 31 and the image-side surface 32 of the third lens element 30 are aspheric surfaces, but it is not limited thereto.

The fourth lens element 40 has positive refracting power. An optical axis region 43 of the object-side surface 41 of the fourth lens element 40 is convex, and a periphery region 44 of the object-side surface 41 of the fourth lens element 40 is concave. An optical axis region 46 of the image-side surface 42 of the fourth lens element 40 is convex, and a periphery region 47 of the image-side surface 42 of the fourth lens element 40 is convex. Besides, both the object-side surface 41 and the image-side surface 42 of the fourth lens element 40 are aspheric surfaces, but it is not limited thereto.

The first lens element 10, the second lens element 20, the third lens element 30 and the fourth lens element 40 of the optical imaging lens 1 of the present invention, there are 8 surfaces, such as the object-side surfaces 11/21/31/41 and the image-side surfaces 12/22/32/42. If a surface is aspheric, these aspheric coefficients are defined according to the following formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

In which:
Y represents a perpendicular distance from a point on the aspheric surface to the optical axis;
Z represents the depth of an aspheric surface (the perpendicular distance between the point of the aspheric surface at a distance Y from the optical axis and the tangent plane of the vertex of the aspheric surface on the optical axis);
R represents the radius of curvature of the lens element surface;
K is a conic constant; and
$a_{2i}$ is the aspheric coefficient of the $2i^{th}$ order.

The optical data of the first embodiment of the optical imaging lens 1 are shown in FIG. 30 while the aspheric surface data are shown in FIG. 31. In the present embodiments of the optical imaging lens, the f-number of the entire optical imaging lens is Fno, EFL is the effective focal length, HFOV stands for the half field of view which is half of the field of view of the entire optical imaging lens, and the unit for the radius of curvature, the thickness and the focal length is in millimeters (mm). In this embodiment, TTL=1.172 mm; EFL=0.435 mm; HFOV=64.000 degrees; ImgH=0.273 mm; Fno=2.000.

Second Embodiment

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the optical axis region and the periphery region will be omitted in the following embodiments. Please refer to FIG. 9A for the longitudinal spherical aberration on the image plane 4 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 44 of the object-side surface 41 of the fourth lens element 40 is convex, the periphery region 47 of the image-side surface 42 of the fourth lens element 40 is concave.

The optical data of the second embodiment of the optical imaging lens are shown in FIG. 32 while the aspheric surface data are shown in FIG. 33. In this embodiment, TTL=1.744 mm; EFL=0.494 mm; HFOV=64.000 degrees; ImgH=0.449 mm; Fno=2.433. In particular: 1. The field curvature aberration on the tangential direction in this embodiment is smaller than the field curvature aberration on the tangential direction in the first embodiment; 2. The distortion aberration in this embodiment is smaller than the distortion aberration in the first embodiment.

Third Embodiment

Please refer to FIG. 10 which illustrates the third embodiment of the optical imaging lens 1 of the present invention. Please refer to FIG. 11A for the longitudinal spherical aberration on the image plane 4 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 44 of the object-side surface 41 of the fourth lens element 40 is convex.

The optical data of the third embodiment of the optical imaging lens are shown in FIG. 34 while the aspheric surface data are shown in FIG. 35. In this embodiment, TTL=1.576 mm; EFL=0.341 mm; HFOV=72.000 degrees; ImgH=0.288 mm; Fno=2.000. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The HFOV in this embodiment is larger than the HFOV in the first embodiment.

Fourth Embodiment

Figure 12:
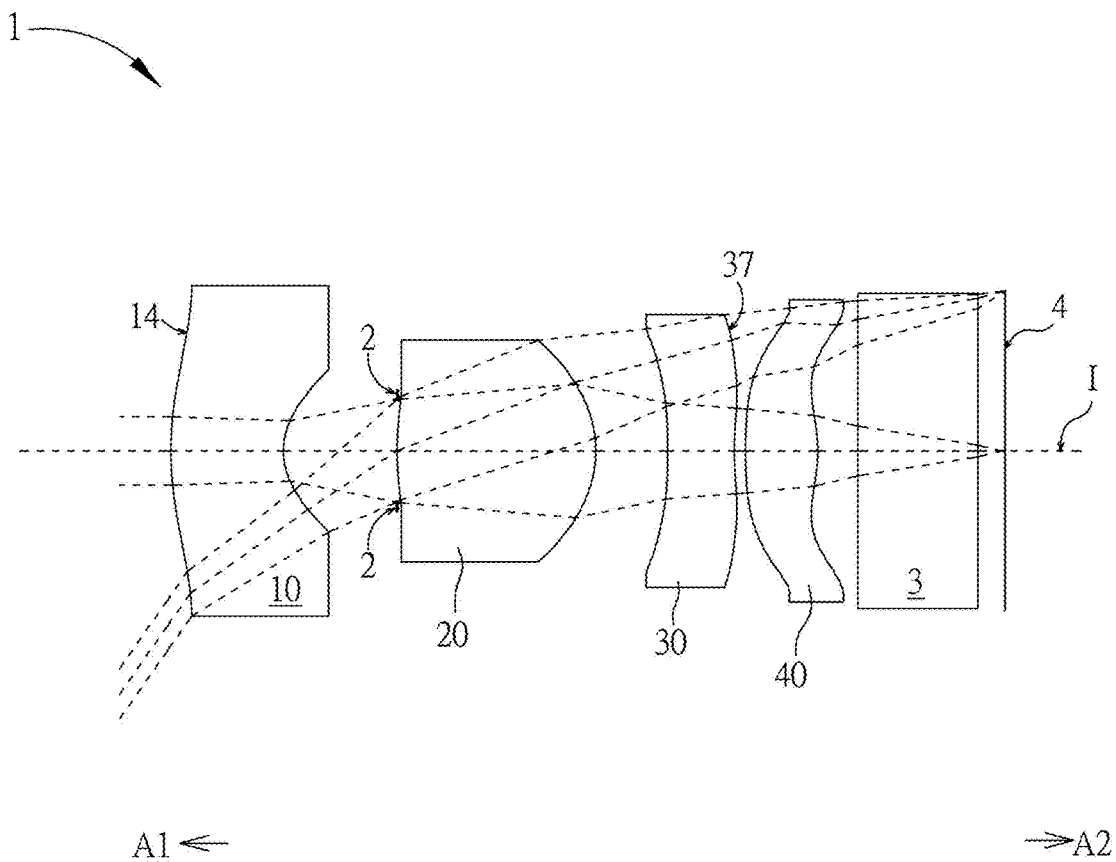
FIG. 12 illustrates a fourth embodiment of the optical imaging lens of the present invention.
Figure 13A:
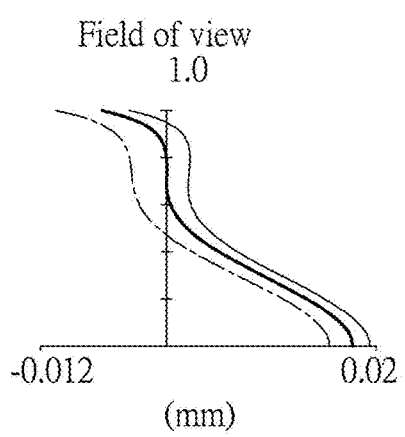
FIG. 13A illustrates the longitudinal spherical aberration on the image plane of the fourth embodiment.
Figure 13B:
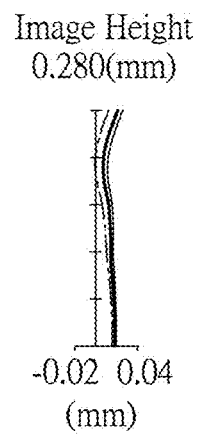
FIG. 13B illustrates the field curvature aberration on the sagittal direction of the fourth embodiment.
Figure 13C:
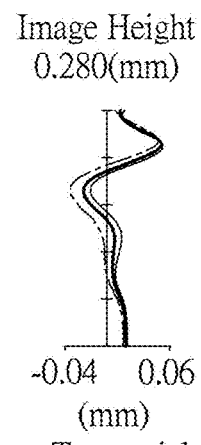
FIG. 13C illustrates the field curvature aberration on the tangential direction of the fourth embodiment.
Figure 13D:
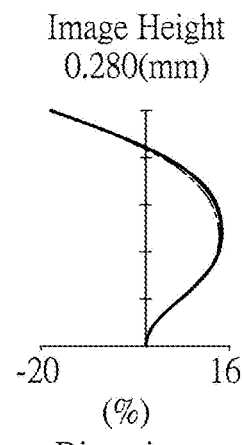
FIG. 13D illustrates the distortion of the fourth embodiment.

Please refer to FIG. 12 which illustrates the fourth embodiment of the optical imaging lens 1 of the present invention. Please refer to FIG. 13A for the longitudinal spherical aberration on the image plane 4 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 14 of the object-side surface 11 of the first lens element 10 is convex, the periphery region 37 of the image-side surface 32 of the third lens element 30 is convex.

The optical data of the fourth embodiment of the optical imaging lens are shown in FIG. 36 while the aspheric surface data are shown in FIG. 37. In this embodiment, TTL=1.460 mm; EFL=0.240 mm; HFOV=55.000 degrees; ImgH=0.280 mm; Fno=2.000. In particular: 1. The field curvature aberration on the sagittal direction in this embodiment is smaller than the field curvature aberration on the sagittal direction in the first embodiment; 2. The distortion aberration in this embodiment is smaller than the distortion aberration in the first embodiment.

Fifth Embodiment

Please refer to FIG. 14 which illustrates the fifth embodiment of the optical imaging lens 1 of the present invention. Please refer to FIG. 15A for the longitudinal spherical aberration on the image plane 4 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the periphery region 37 of the image-side surface 32 of the third lens element 30 is convex, the periphery region 44 of the object-side surface 41 of the fourth lens element 40 is convex.

The optical data of the fifth embodiment of the optical imaging lens are shown in FIG. 38 while the aspheric surface data are shown in FIG. 39 In this embodiment, TTL=1.839 mm; EFL=0.378 mm; HFOV=64.000 degrees; ImgH=0.352 mm; Fno=2.304. In particular: 1. The distortion aberration in this embodiment is smaller than the distortion aberration in the first embodiment.

Sixth Embodiment

Please refer to FIG. 16 which illustrates the sixth embodiment of the optical imaging lens 1 of the present invention. Please refer to FIG. 17A for the longitudinal spherical aberration on the image plane 4 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex, the periphery region 37 of the image-side surface 32 of the third lens element 30 is convex, the periphery region 44 of the object-side surface 41 of the fourth lens element 40 is convex.

The optical data of the sixth embodiment of the optical imaging lens are shown in FIG. 40 while the aspheric surface data are shown in FIG. 41. In this embodiment, TTL=1.316 mm; EFL=0.436 mm; HFOV=55.000 degrees; ImgH=0.347 mm; Fno=2.000. In particular: 1. The distortion aberration in this embodiment is smaller than the distortion aberration in the first embodiment.

Seventh Embodiment

Please refer to FIG. 18 which illustrates the seventh embodiment of the optical imaging lens 1 of the present invention. Please refer to FIG. 19A for the longitudinal spherical aberration on the image plane 4 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex, the fourth lens element 40 has negative refracting power, the optical axis region 43 of the object-side surface 41 of the fourth lens element 40 is concave, the periphery region 44 of the object-side surface 41 of the fourth lens element 40 is convex, the periphery region 47 of the image-side surface 42 of the fourth lens element 40 is concave.

The optical data of the seventh embodiment of the optical imaging lens are shown in FIG. 42 while the aspheric surface data are shown in FIG. 43. In this embodiment, TTL=1.701 mm; EFL=0.388 mm; HFOV=64.000 degrees; ImgH=0.311 mm; Fno=2.000. In particular: 1. The field curvature aberration on the sagittal direction in this embodiment is smaller than the field curvature aberration on the sagittal direction in the first embodiment; 2. The field curvature aberration on the tangential direction in this embodiment is smaller than the field curvature aberration on the tangential direction in the first embodiment; 3. The distortion aberration in this embodiment is smaller than the distortion aberration in the first embodiment.

Eighth Embodiment

Please refer to FIG. 20 which illustrates the eighth embodiment of the optical imaging lens 1 of the present invention. Please refer to FIG. 21A for the longitudinal spherical aberration on the image plane 4 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex, the periphery region 34 of the object-side surface 31 of the third lens element 30 is convex, the periphery region 37 of the image-side surface 32 of the third lens element 30 is convex, the periphery region 44 of the object-side surface 41 of the fourth lens element 40 is convex.

The optical data of the eighth embodiment of the optical imaging lens are shown in FIG. 44 while the aspheric surface data are shown in FIG. 45. In this embodiment, TTL=1.743 mm; EFL=0.226 mm; HFOV=55.000 degrees; ImgH=0.132 mm; Fno=2.104. In particular: 1. The distortion aberration in this embodiment is smaller than the distortion aberration in the first embodiment.

Ninth Embodiment

Figure 22:
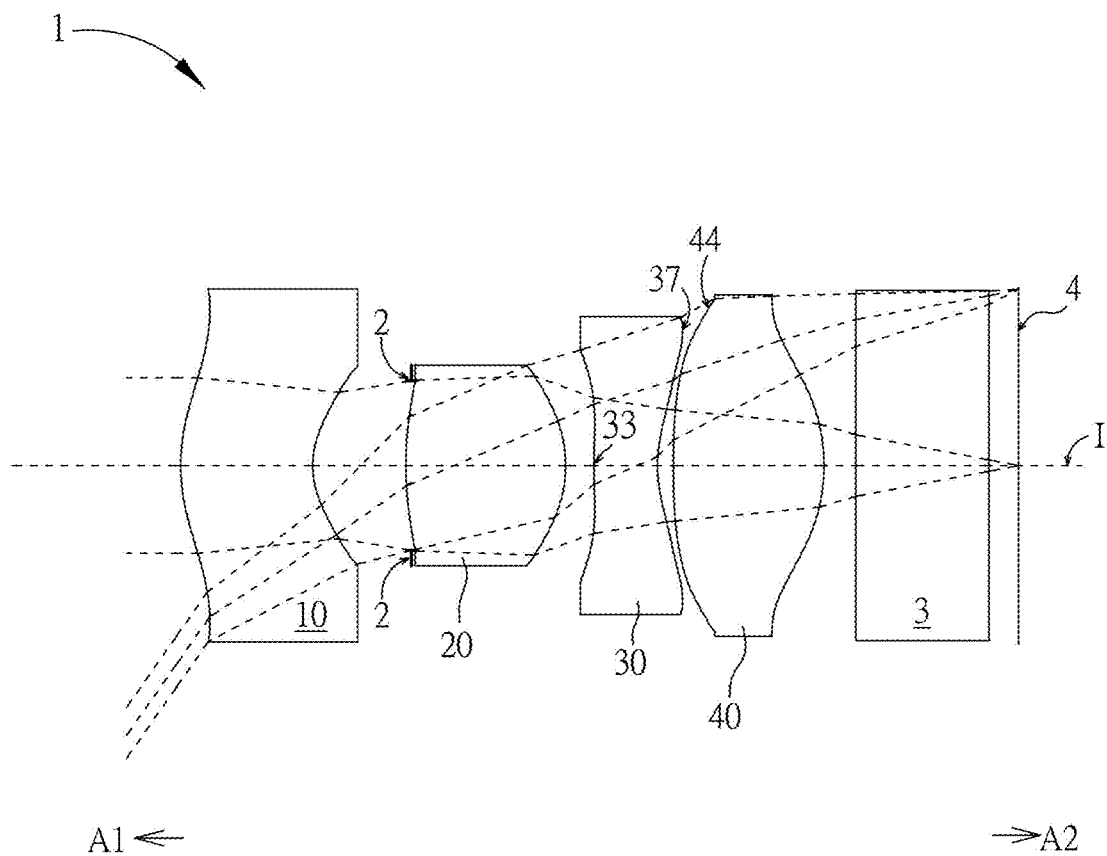
FIG. 22 illustrates a ninth embodiment of the optical imaging lens of the present invention.
Figure 23A:
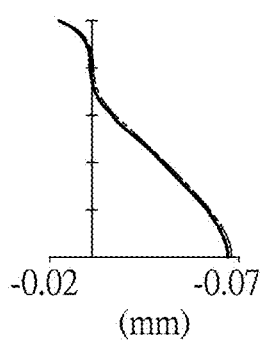
FIG. 23A illustrates the longitudinal spherical aberration on the image plane of the ninth embodiment.
Figure 23B:
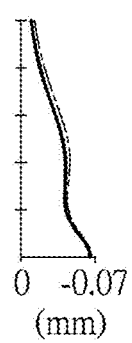
FIG. 23B illustrates the field curvature aberration on the sagittal direction of the ninth embodiment.
Figure 23C:
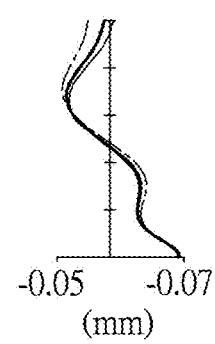
FIG. 23C illustrates the field curvature aberration on the tangential direction of the ninth embodiment.
Figure 23D:
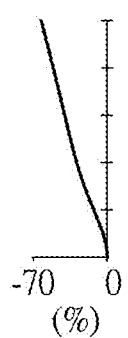
FIG. 23D illustrates the distortion of the ninth embodiment.

Please refer to FIG. 22 which illustrates the ninth embodiment of the optical imaging lens 1 of the present invention. Please refer to FIG. 23A for the longitudinal spherical aberration on the image plane 4 of the ninth embodiment; please refer to FIG. 22B for the field curvature aberration on the sagittal direction; please refer to FIG. 22C for the field curvature aberration on the tangential direction, and please refer to FIG. 22D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex, the periphery region 37 of the image-side surface 32 of the third lens element 30 is convex, the periphery region 44 of the object-side surface 41 of the fourth lens element 40 is convex.

The optical data of the ninth embodiment of the optical imaging lens are shown in FIG. 46 while the aspheric surface data are shown in FIG. 47. In this embodiment, TTL=1.318 mm; EFL=0.553 mm; HFOV=55.000 degrees; ImgH=0.280 mm; Fno=2.000. In particular: 1. The distortion aberration in this embodiment is smaller than the distortion aberration in the first embodiment.

Tenth Embodiment

Please refer to FIG. 24 which illustrates the tenth embodiment of the optical imaging lens 1 of the present invention. Please refer to FIG. 25A for the longitudinal spherical aberration on the image plane 4 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 43 of the object-side surface 41 of the fourth lens element 40 is concave, the periphery region 44 of the object-side surface 41 of the fourth lens element 40 is convex, the periphery region 47 of the image-side surface 42 of the fourth lens element 40 is concave.

The optical data of the tenth embodiment of the optical imaging lens are shown in FIG. 48 while the aspheric surface data are shown in FIG. 49. In this embodiment, TTL=1.941 mm; EFL=0.325 mm; HFOV=64.000 degrees; ImgH=0.234 mm; Fno=1.883. In particular: 1. The Fno in this embodiment is smaller than the Fno in the first embodiment; 2. The longitudinal spherical aberration in this embodiment is smaller than the longitudinal spherical aberration in the first embodiment; 3. The field curvature aberration on the sagittal direction in this embodiment is smaller than the field curvature aberration on the sagittal direction in the first embodiment; 4. The field curvature aberration on the tangential direction in this embodiment is smaller than the field curvature aberration on the tangential direction in the first embodiment; 5. The distortion aberration in this embodiment is smaller than the distortion aberration in the first embodiment.

Eleventh Embodiment

Figure 26:
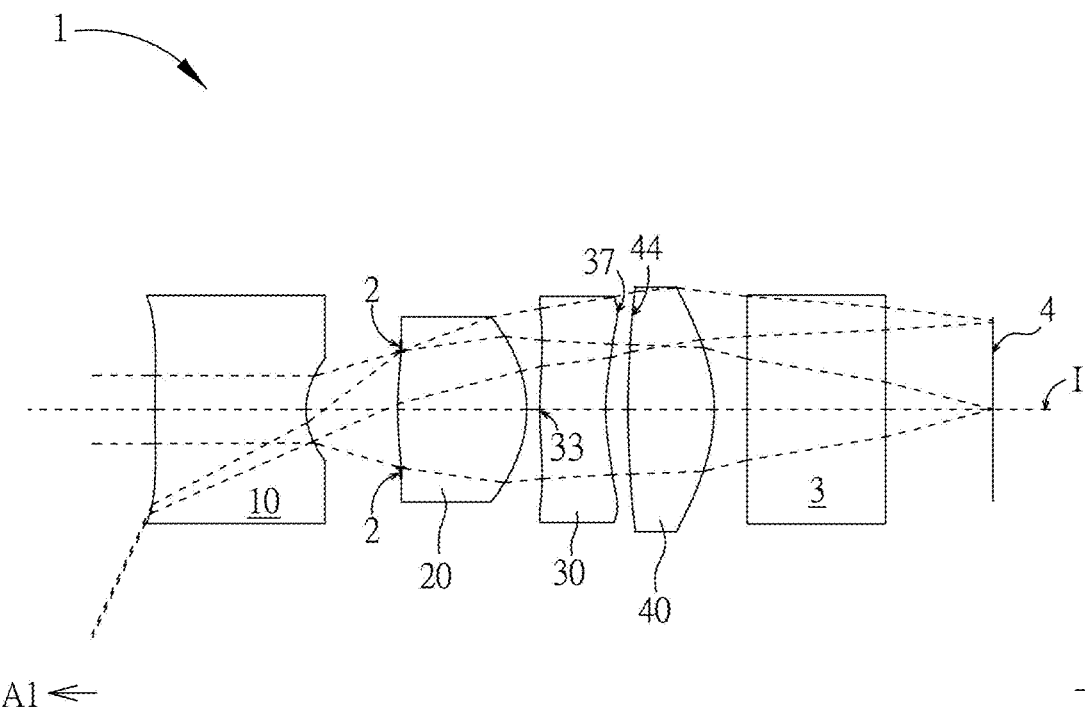
FIG. 26 illustrates an eleventh embodiment of the optical imaging lens of the present invention.
Figures 27A, 27B, 27C, 27D:
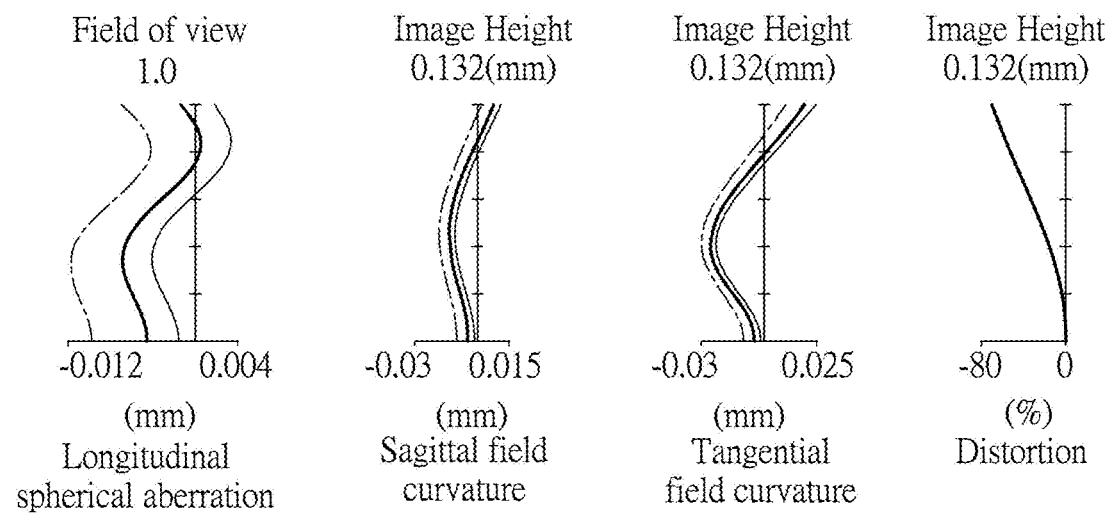
FIG. 27A illustrates the longitudinal spherical aberration on the image plane of the eleventh embodiment.
FIG. 27B illustrates the field curvature aberration on the sagittal direction of the eleventh embodiment.
FIG. 27C illustrates the field curvature aberration on the tangential direction of the eleventh embodiment.
FIG. 27D illustrates the distortion of the eleventh embodiment.

Please refer to FIG. 26 which illustrates the eleventh embodiment of the optical imaging lens 1 of the present invention. Please refer to FIG. 27A for the longitudinal spherical aberration on the image plane 4 of the eleventh embodiment; please refer to FIG. 27B for the field curvature aberration on the sagittal direction; please refer to FIG. 27C for the field curvature aberration on the tangential direction, and please refer to FIG. 27D for the distortion aberration.

The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex, the periphery region 37 of the image-side surface 32 of the third lens element 30 is convex, the periphery region 44 of the object-side surface 41 of the fourth lens element 40 is convex.

The optical data of the eleventh embodiment of the optical imaging lens are shown in FIG. 50 while the aspheric surface data are shown in FIG. 51. In this embodiment, TTL=1.272 mm; EFL=0.207 mm; HFOV=65.000 degrees; ImgH=0.132 mm; Fno=2.000. In particular: 1. The longitudinal spherical aberration in this embodiment is smaller than the longitudinal spherical aberration in the first embodiment; 2. The field curvature aberration on the sagittal direction in this embodiment is smaller than the field curvature aberration on the sagittal direction in the first embodiment; 3. The field curvature aberration on the tangential direction in this embodiment is smaller than the field curvature aberration on the tangential direction in the first embodiment; 4. The distortion aberration in this embodiment is smaller than the distortion aberration in the first embodiment; 5. The HFOV in this embodiment is larger than the HFOV in the first embodiment.

Twelfth Embodiment

Please refer to FIG. 28 which illustrates the twelfth embodiment of the optical imaging lens 1 of the present invention. Please refer to FIG. 29A for the longitudinal spherical aberration on the image plane 4 of the twelfth embodiment; please refer to FIG. 29B for the field curvature aberration on the sagittal direction; please refer to FIG. 29C for the field curvature aberration on the tangential direction, and please refer to FIG. 29D for the distortion aberration. The components in this embodiment are similar to those in the first embodiment, but the optical data such as the radius of curvature, the lens thickness, the aspheric surface or the back focal length in this embodiment are different from the optical data in the first embodiment. In addition, in this embodiment, the optical axis region 33 of the object-side surface 31 of the third lens element 30 is convex.

The optical data of the twelfth embodiment of the optical imaging lens are shown in FIG. 52 while the aspheric surface data are shown in FIG. 53. In this embodiment, TTL=1.283 mm; EFL=0.408 mm; HFOV=75.000 degrees; ImgH=0.377 mm; Fno=2.000. In particular: 1. The HFOV in this embodiment is larger than the HFOV in the first embodiment; 2. The longitudinal spherical aberration in this embodiment is smaller than the longitudinal spherical aberration in the first embodiment.

Some important ratios in each embodiment are shown in FIG. 54 and FIG. 55.

1. The embodiment of the present invention achieves the purpose of lens miniaturization by satisfying the relationship of Tmax+Tmin≤700.000 μm, and through the design of surface shape and refracting power, the first lens element 10 has negative refracting power and the optical axis region 46 of the image-side surface 42 of the fourth lens element 40 is convex, which can effectively achieve the purpose of correcting optical system aberration and reducing distortion by matching with one of the following relationship's combinations, and can simultaneously expand the field of view:

(a) the optical axis region 13 of the object-side surface 11 of the first lens element 10 is convex, and the third lens element 30 has negative refracting power;
(b) the optical axis region 13 of the object-side surface 11 of the first lens element 10 is convex, and the periphery region 27 of the image-side surface 22 of the second lens element 20 is convex;
(c) the periphery region 24 of the object-side surface 21 of the second lens element 20 is convex, and the periphery region 27 of the image-side surface 22 of the second lens element 20 is convex, wherein the preferable range is 200.000 μm≤Tmax+Tmin≤700.000 μm.

2. In order to shorten the system length of optical imaging lens, the air gap between lens elements or lens thickness can be adjusted appropriately, but the difficulty of manufacturing and the imaging quality must be considered at the same time. Therefore, if the numerical limits of the following relationships are satisfied, the better configuration can be obtained:

HFOV/(EFL+TL)≥35.000 degrees/mm, the preferable range is 35.000 degrees/mm≤HFOV/(EFL+TL)≤65.000 degrees/mm;

EFL/(T2+G34)≤2.000, the preferable range is 0.500≤EFL/(T2+G34)≤2.000;

(EFL+BFL)/Gmax≥1.800, the preferable range is 1.800≤(EFL+BFL)/Gmax≤6.000;

HFOV/(Tmax+Tmax2)≥85.000 degrees/mm, the preferable range is 85.000 degrees/mm≤HFOV/(Tmax+Tmax2)≤210.000 degrees/mm;

(G12+T2)/(T3+G34)≥2.500, the preferable range is 2.500≤(G12+T2)/(T3+G34)≤18.000;

HFOV/(TTL*Fno)≥15.000 degrees/mm, the preferable range is 15.000 degrees/mm≤HFOV/(TTL*Fno)≤30.000 degrees/mm;

ALT/(G12+T2)≤2.000, the preferable range is 0.500≤ALT/(G12+T2)≤2.000;

(BFL+G34)/T4≤3.500, the preferable range is 1.200≤(BFL+G34)/T4≤3.500;

ALT/(G23+T3+G34)≥3.000, the preferable range is 3.000≤ALT/(G23+T3+G34)≤9.000;

(ALT+EFL)/AAG≥2.000, the preferable range is 2.000≤(ALT+EFL)/AAG≤6.500;

EFL/T1≤3.900, the preferable range is 0.800≤EFL/T1≤3.900;

(T3+G34+T4+BFL)/T1≥3.000, the preferable range is 3.000≤(T3+G34+T4+BFL)/T1≤7.000;

TTL/(T1+T2+T4)≤3.200, the preferable range is 1.800≤TTL/(T1+T2+T4)≤3.200;

(G12+T2+BFL)/AAG≥2.000, the preferable range is 2.000≤(G12+T2+BFL)/AAG≤4.000;

(Gmax+BFL)/Tavg≥2.200, the preferable range is 2.200≤(Gmax+BFL)/Tavg≤7.000; and (ImgH+EFL)/Tmin2≥1.800, the preferable range is 1.800≤(ImgH+EFL)/Tmin2≤7.500.

3. The embodiment of the invention can simultaneously keep good optical imaging quality and improve the manufacturing yield for designing miniaturized lens by satisfying the comparison relationship between the following optical parameters:

(1) T4>G23;
(2) T1>T3;
(3) ALT>G12.

By observing three representative wavelengths of blue, green and red in each embodiment of the present invention, it is suggested off-axis light of different heights of every wavelength all concentrates on the image plane, and deviations of every curve also reveal that off-axis light of different heights are well controlled so the embodiments do improve the spherical aberration, the astigmatic aberration and the distortion aberration. In addition, by observing the imaging quality data the distances amongst the three representing different wavelengths of blue, green and red are pretty close to one another, which means the embodiments of the present invention are able to concentrate light of the three representing different wavelengths so that the aberration is greatly improved. Given the above, it is understood that the embodiments of the present invention provides outstanding imaging quality.

In addition, any arbitrary combination of the parameters of the embodiments can be selected to increase the lens limitation so as to facilitate the design of the same structure of the present invention.

In the light of the unpredictability of the optical imaging lens, the present invention suggests the above principles to have a shorter system length of the optical imaging lens, a larger aperture, a larger field of view, better imaging quality or a better fabrication yield to overcome the drawbacks of prior art.

In addition to the above ratios, one or more conditional formulae may be optionally combined to be used in the embodiments of the present invention and the present invention is not limit to this. The concave or convex configuration of each lens element or multiple lens elements may be fine-tuned to enhance the performance and/or the resolution. The above limitations may be selectively combined in the embodiments without causing inconsistency.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, wherein:
   the first lens element has negative refracting power, and an optical axis region of the object-side surface of the first lens element is convex;
   the third lens has negative refracting power, and an optical axis region of the image-side surface of the third lens element is concave;
   an optical axis region of the image-side surface of the fourth lens element is convex;
   lens elements included by the optical imaging lens are only the four lens elements described above, and the optical imaging lens satisfies the following relationships: Tmax+Tmin≤700.000 µm, wherein Tmax is the maximum value of thicknesses of the four lens elements from the first lens element to the fourth lens element along the optical axis, Tmin is the minimum value of thicknesses of the four lens elements from the first lens element to the fourth lens element along the optical axis.

2. The optical imaging lens of claim 1, wherein HFOV is a half field of view of the optical imaging lens, EFL is an effective focal length of the optical imaging lens, TL is a distance from the object-side surface of the first lens element to the image-side surface of the fourth lens element along the optical axis, and the optical imaging lens satisfies the relationship: HFOV/(EFL+TL)≥35.000 degrees/mm.

3. The optical imaging lens of claim 1, wherein EFL is an effective focal length of the optical imaging lens, T2 is a thickness of the second lens element along the optical axis, G34 is an air gap between the third lens element and the fourth lens element along the optical axis, and the optical imaging lens satisfies the relationship: EFL/(T2+G34)≤2.000.

4. The optical imaging lens of claim 1, wherein EFL is an effective focal length of the optical imaging lens, BFL is a distance from the image-side surface of the fourth lens element to an image plane along the optical axis, Gmax is the maximum value of three air gaps from the first lens element to the fourth lens element along the optical axis, and the optical imaging lens satisfies the relationship: (EFL+BFL)/Gmax≥1.800.

5. The optical imaging lens of claim 1, wherein HFOV is a half field of view of the optical imaging lens, Tmax2 is the second largest value of thicknesses of the four lens elements from the first lens element to the fourth lens element along the optical axis, and the optical imaging lens satisfies the relationship: HFOV/(Tmax+Tmax2)≥85.000 degrees/mm.

6. The optical imaging lens of claim 1, wherein G12 is an air gap between the first lens element and the second lens element along the optical axis, T2 is a thickness of the second lens element along the optical axis, T3 is a thickness of the third lens element along the optical axis, G34 is an air gap between the third lens element and the fourth lens element along the optical axis, and the optical imaging lens satisfies the relationship: (G12+T2)/(T3+G34)≥2.500.

7. The optical imaging lens of claim 1, wherein HFOV is a half field of view of the optical imaging lens, TTL is a distance from the object-side surface of the first lens element to an image plane along the optical axis, Fno is a f-number of the optical imaging lens, and the optical imaging lens satisfies the relationship: HFOV/(TTL*Fno)≥15.000 degrees/mm.

8. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, wherein:
the first lens element has negative refracting power, and an optical axis region of the object-side surface of the first lens element is convex;
a periphery region of the image-side surface of the second lens element is convex;
an optical axis region of the image-side surface of the third lens element is concave;
an optical axis region of the image-side surface of the fourth lens element is convex;
lens elements included by the optical imaging lens are only the four lens elements described above, and the optical imaging lens satisfies the following relationships: Tmax+Tmin≤700.000 μm, wherein Tmax is the maximum value of thicknesses of the four lens elements from the first lens element to the fourth lens element along the optical axis, Tmin is the minimum value of thicknesses of the four lens elements from the first lens element to the fourth lens element along the optical axis.

9. The optical imaging lens of claim 8, wherein T4 is a thickness of the fourth lens element along the optical axis, G23 is an air gap between the second lens element and the third lens element along the optical axis, and the optical imaging lens satisfies the relationship: T4>G23.

10. The optical imaging lens of claim 8, wherein ALT is a sum of thicknesses of all the four lens elements along the optical axis, G12 is an air gap between the first lens element and the second lens element along the optical axis, T2 is a thickness of the second lens element along the optical axis, and the optical imaging lens satisfies the relationship: ALT/(G12+T2)≤2.000.

11. The optical imaging lens of claim 8, wherein BFL is a distance from the image-side surface of the fourth lens element to an image plane along the optical axis, G34 is an air gap between the third lens element and the fourth lens element along the optical axis, T4 is a thickness of the fourth lens element along the optical axis, and the optical imaging lens satisfies the relationship: (BFL+G34)/T4≤3.500.

12. The optical imaging lens of claim 8, wherein ALT is a sum of thicknesses of all the four lens elements along the optical axis, G23 is an air gap between the second lens element and the third lens element along the optical axis, T3 is a thickness of the third lens element along the optical axis, G34 is an air gap between the third lens element and the fourth lens element along the optical axis, and the optical imaging lens satisfies the relationship: ALT/(G23+T3+G34)≥3.000.

13. The optical imaging lens of claim 8, wherein ALT is a sum of thicknesses of all the four lens elements along the optical axis, EFL is an effective focal length of the optical imaging lens, AAG is a sum of three air gaps from the first lens element to the fourth lens element along the optical axis, and the optical imaging lens satisfies the relationship: (ALT+EFL)/AAG≥2.000.

14. The optical imaging lens of claim 8, wherein T1 is a thickness of the first lens element along the optical axis, T3 is a thickness of the third lens element along the optical axis, and the optical imaging lens satisfies the relationship: T1>T3.

15. An optical imaging lens, from an object side to an image side in order along an optical axis comprising: a first lens element, a second lens element, a third lens element and a fourth lens element, the first lens element to the fourth lens element each having an object-side surface facing toward the object side and allowing imaging rays to pass through as well as an image-side surface facing toward the image side and allowing the imaging rays to pass through, wherein:
the first lens element has negative refracting power;
a periphery region of the object-side surface of the second lens element is convex, and a periphery region of the image-side surface of the second lens element is convex;
an optical axis region of the image-side surface of the third lens element is concave;
an optical axis region of the image-side surface of the fourth lens element is convex;
lens elements included by the optical imaging lens are only the four lens elements described above, and the optical imaging lens satisfies the following relationships: Tmax+Tmin≤700.000 μm, wherein Tmax is the maximum value of thicknesses of the four lens elements from the first lens element to the fourth lens element along the optical axis, Tmin is the minimum value of thicknesses of the four lens elements from the first lens element to the fourth lens element along the optical axis.

16. The optical imaging lens of claim 15, wherein EFL is an effective focal length of the optical imaging lens, T1 is a thickness of the first lens element along the optical axis, and the optical imaging lens satisfies the relationship: EFL/T1≤3.900.

17. The optical imaging lens of claim 15, wherein T3 is a thickness of the third lens element along the optical axis, G34 is an air gap between the third lens element and the fourth lens element along the optical axis, T4 is a thickness of the fourth lens element along the optical axis, BFL is a distance from the image-side surface of the fourth lens element to an image plane along the optical axis, T1 is a thickness of the first lens element along the optical axis, and the optical imaging lens satisfies the relationship: $(T3+G34+T4+BFL)/T1 \geq 3.000$.

18. The optical imaging lens of claim 15, wherein TTL is a distance from the object-side surface of the first lens element to an image plane along the optical axis, T1 is a thickness of the first lens element along the optical axis, T2 is a thickness of the second lens element along the optical axis, T4 is a thickness of the fourth lens element along the optical axis, and the optical imaging lens satisfies the relationship: $TTL/(T1+T2+T4) \leq 3.200$.

19. The optical imaging lens of claim 15, wherein ALT is a sum of thicknesses of all the four lens elements along the optical axis, G12 is an air gap between the first lens element and the second lens element along the optical axis, and the optical imaging lens satisfies the relationship: $ALT > G12$.

20. The optical imaging lens of claim 15, wherein G12 is an air gap between the first lens element and the second lens element along the optical axis, T2 is a thickness of the second lens element along the optical axis, BFL is a distance from the image-side surface of the fourth lens element to an image plane along the optical axis, AAG is a sum of three air gaps from the first lens element to the fourth lens element along the optical axis, and the optical imaging lens satisfies the relationship: $(G12+T2+BFL)/AAG \geq 2.000$.

* * * * *